US011765730B2

(12) United States Patent
Yoshioka et al.

(10) Patent No.: US 11,765,730 B2
(45) Date of Patent: Sep. 19, 2023

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 79 days.

(21) Appl. No.: 16/651,782

(22) PCT Filed: Sep. 29, 2017

(86) PCT No.: PCT/JP2017/035717
§ 371 (c)(1),
(2) Date: Mar. 27, 2020

(87) PCT Pub. No.: WO2019/064582
PCT Pub. Date: Apr. 4, 2019

(65) Prior Publication Data
US 2020/0245320 A1    Jul. 30, 2020

(51) Int. Cl.
*H04W 72/21*    (2023.01)
(52) U.S. Cl.
CPC .................................. *H04W 72/21* (2023.01)
(58) Field of Classification Search
CPC ......... H04W 72/0413; H04W 72/1268; H04W 72/1284; H04W 72/1257; H04W 72/0446; H04W 72/0453; H04W 72/12; H04L 5/0078; H04L 5/0005; H04L 5/0044; H04L 5/0053; H04L 1/0013; H04L 1/1664
See application file for complete search history.

(56) References Cited

U.S. PATENT DOCUMENTS 8,611,238 B2 * 12/2013 Papasakellariou .... H04W 28/06
                                                              370/252
2012/0044884 A1 *  2/2012 Jang ........................ H04L 5/001
                                                              370/329
(Continued)

FOREIGN PATENT DOCUMENTS

WO    2017-022425 A1    2/2017
WO    2017-026871 A1    2/2017

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
(Continued)

*Primary Examiner* — Ayaz R Sheikh
*Assistant Examiner* — Tarell A Hampton
(74) *Attorney, Agent, or Firm* — Osha Bergman Watanabe & Burton LLP

(57) ABSTRACT

A terminal is disclosed that includes a transmitter that transmits uplink data and uplink control information using an uplink shared channel. The terminal further includes a processor that determines, based on a bandwidth allocated to the uplink shared channel, one or more resource elements, where the one or more resource elements have a frequency interval and are used for mapping the uplink control information. In other aspects, a radio communication method for a terminal is also disclosed.

9 Claims, 15 Drawing Sheets

(56) References Cited

U.S. PATENT DOCUMENTS

| | | | |
|---|---|---|---|
| 2014/0169242 A1* | 6/2014 | Yang | H04L 1/1812 370/280 |
| 2015/0036618 A1 | 2/2015 | Xu et al. | |
| 2018/0110041 A1* | 4/2018 | Bendlin | H04L 5/0051 |
| 2018/0132269 A1* | 5/2018 | Wang | H04W 52/365 |
| 2018/0167931 A1* | 6/2018 | Papasakellariou | H04L 1/1887 |
| 2018/0310298 A1* | 10/2018 | Li | H04L 5/0053 |
| 2019/0028313 A1 | 1/2019 | Takeda et al. | |
| 2019/0037585 A1* | 1/2019 | Li | H04W 72/1268 |
| 2019/0199477 A1* | 6/2019 | Park | H04L 1/0067 |
| 2020/0052835 A1* | 2/2020 | Xiong | H04L 1/1861 |
| 2020/0177424 A1* | 6/2020 | Noh | H04W 72/0413 |
| 2020/0178222 A1* | 6/2020 | Wang | H04L 5/0044 |
| 2020/0214024 A1 | 7/2020 | Lee et al. | |
| 2020/0383132 A1* | 12/2020 | Yang | H04W 72/0453 |
| 2021/0266883 A1* | 8/2021 | Wang | H04L 5/0048 |

OTHER PUBLICATIONS

3GPP TSG RAN WG1 Meeting NR#3; R1-1716480 "On UCI resource mapping on PUSCH" InterDigital Inc.; Nagoya, Japan; Sep. 18-21, 2017 (3 pages).

3GPP TSG RAN WG1 Meeting NR#3; R1-1716316 "UCI embedding and PUSCH/PUCCH multiplexing" Intel Corporation; Nagoya, Japan; Sep. 18-21, 2017 (7 pages).

International Search Report issued in International Application No. PCT/JP2017/035717, dated Dec. 5, 2017 (3 pages).

Written Opinion issued in International Application No. PCT/JP2017/035717; dated Dec. 5, 2017 (3 pages).

Extended European Search Report issued in counterpart European Patent Application No. 17927323.0, dated Mar. 30, 2021 (12 pages).

3GPP TSG RAN WG1 NR Ad-Hoc#3; R1-1716102 "UCI multiplexing" NTT Docomo, Inc; Nagoya, Japan; Sep. 18-21, 2017 (5 pages).

Office Action issued in Japanese Application No. 2019-544179; dated Nov. 24, 2021 (6 pages).

Office Action issued in Korean Application No. 10-2020-7010993 dated Nov. 18, 2022 (10 pages).

Office Action issued in Japanese Application No. 2019-544179; dated Feb. 22, 2022 (6 pages).

Office Action issued in Indian Application No. 202037017187; dated Mar. 14, 2022 (6 pages).

Office Action issued in African Application No. AP/P/2020/012339; dated Mar. 18, 2022 (4 pages).

Office Action in counterpart Korean Patent Application No. 10-2020-7010993 dated Jul. 26, 2022 (8 pages).

Office Action issued in counterpart Chinese Patent Application No. 201780097234.4 dated Jan. 28, 2023 (21 pages).

Office Action issued in Korean Application No. 10-2020-7010993; dated Jan. 13, 2022 (8 pages).

* cited by examiner

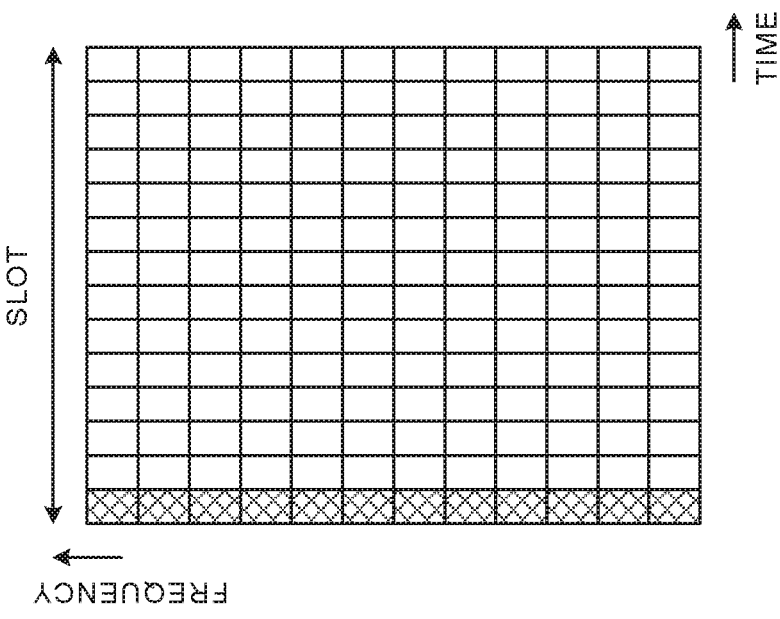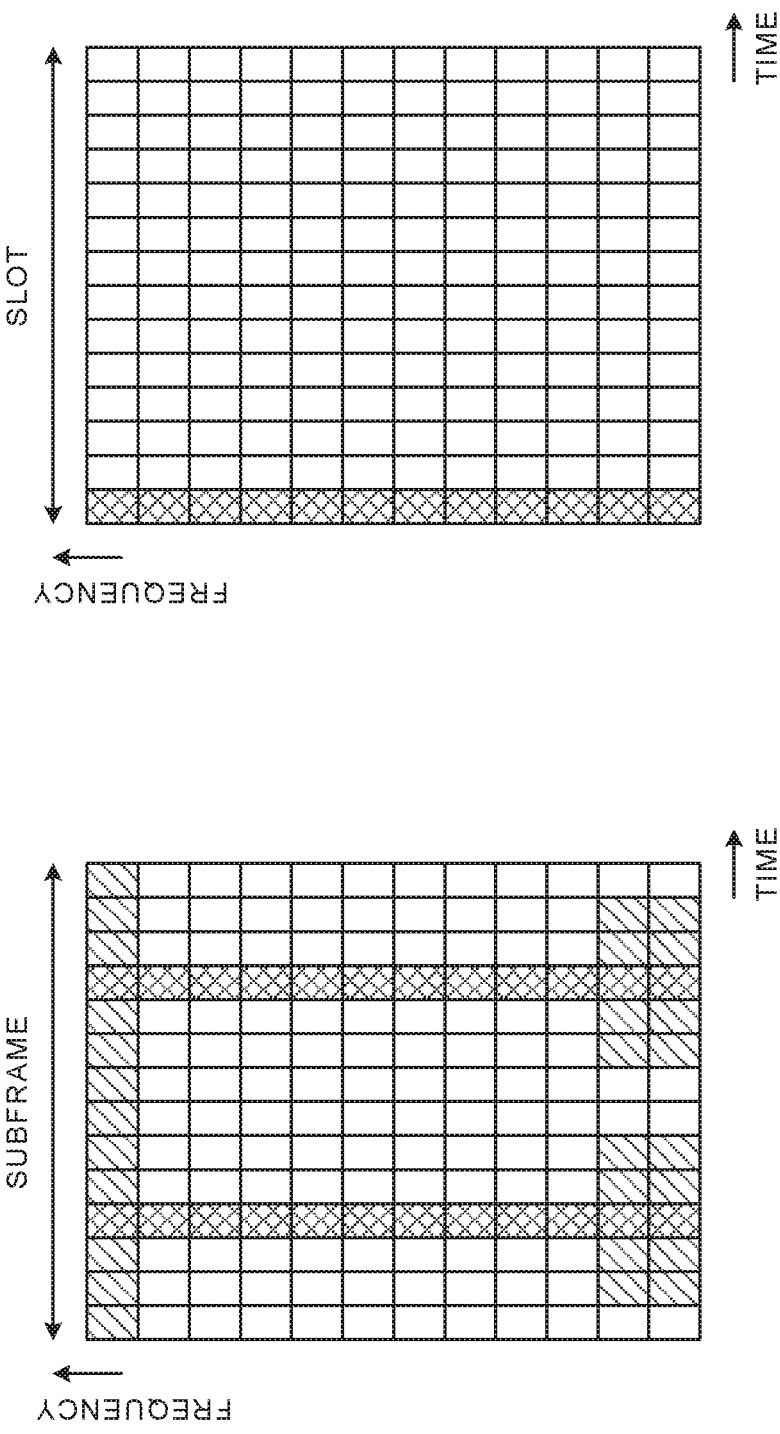

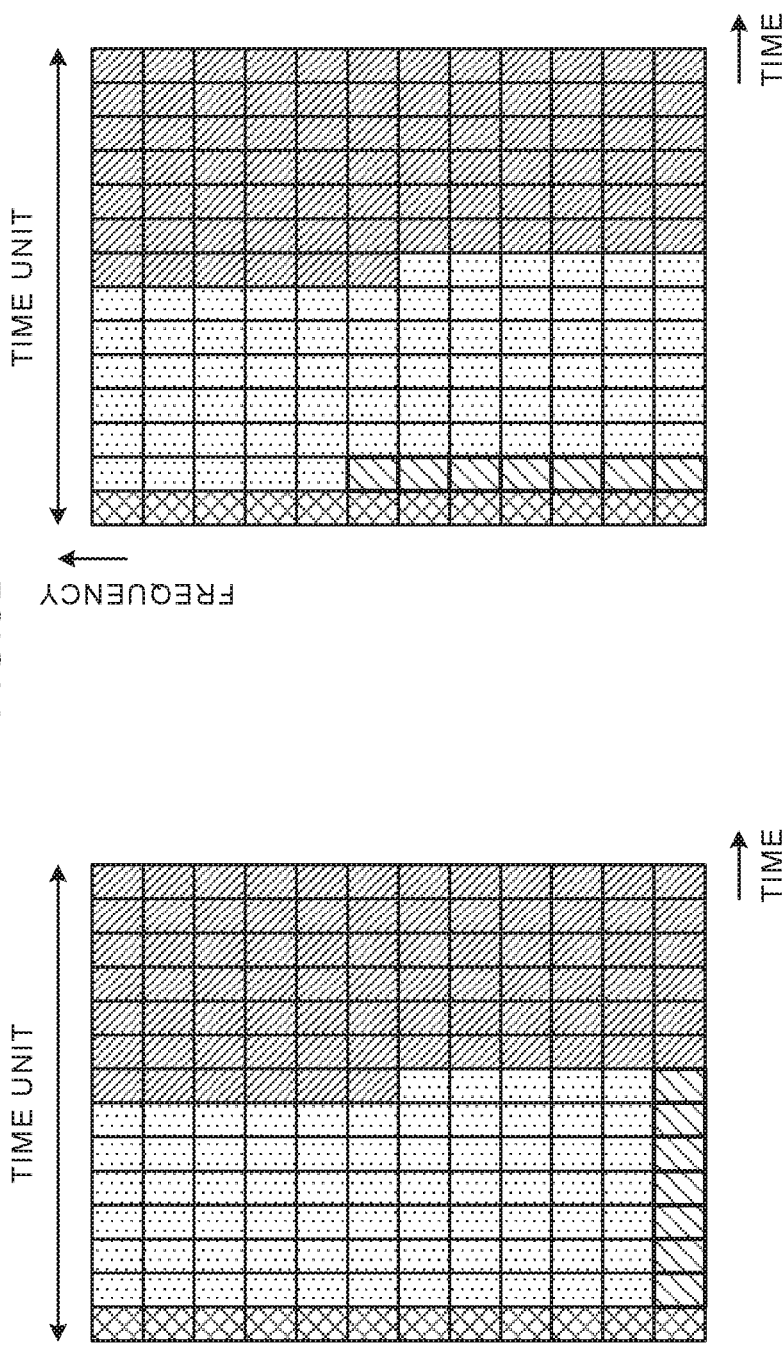

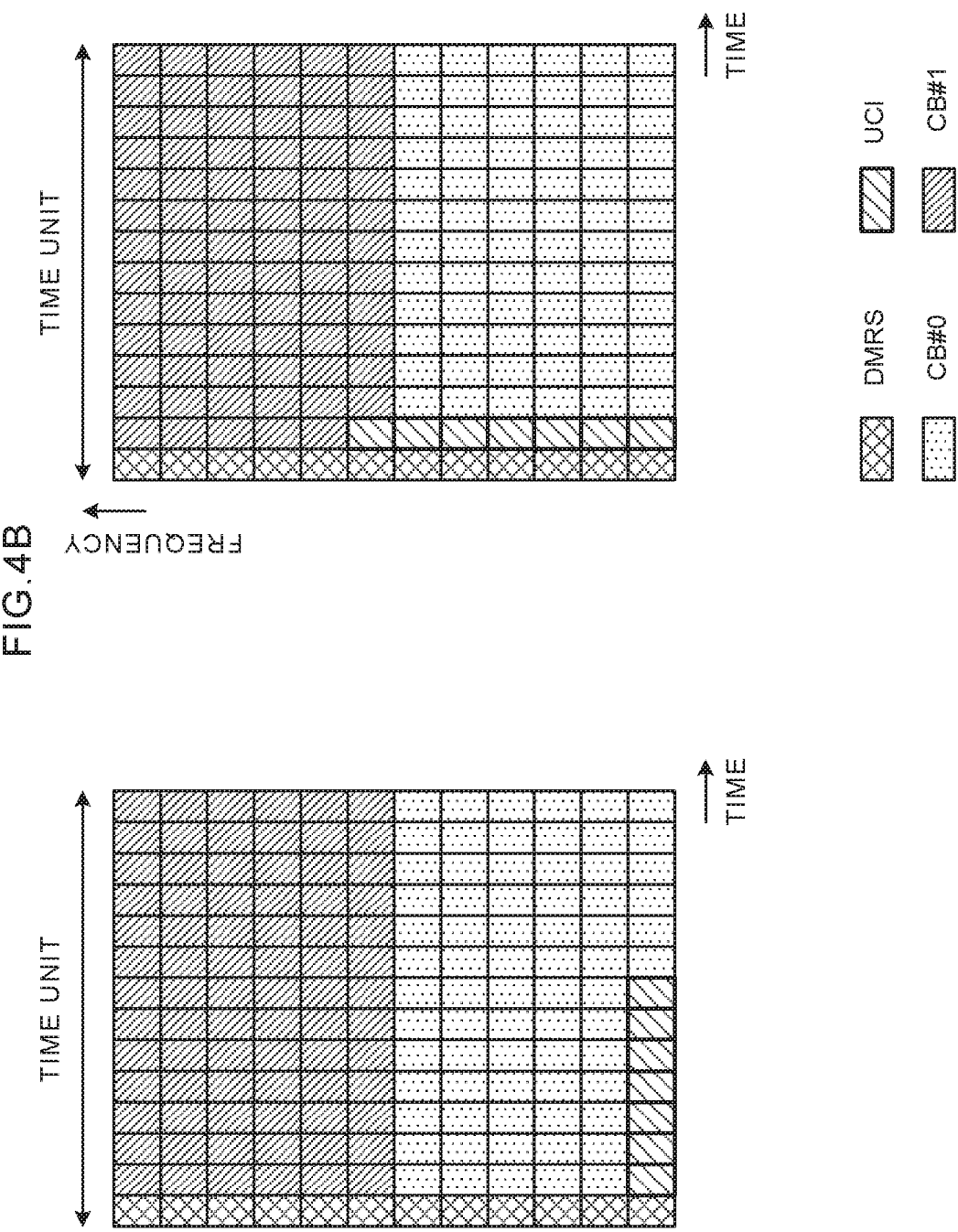

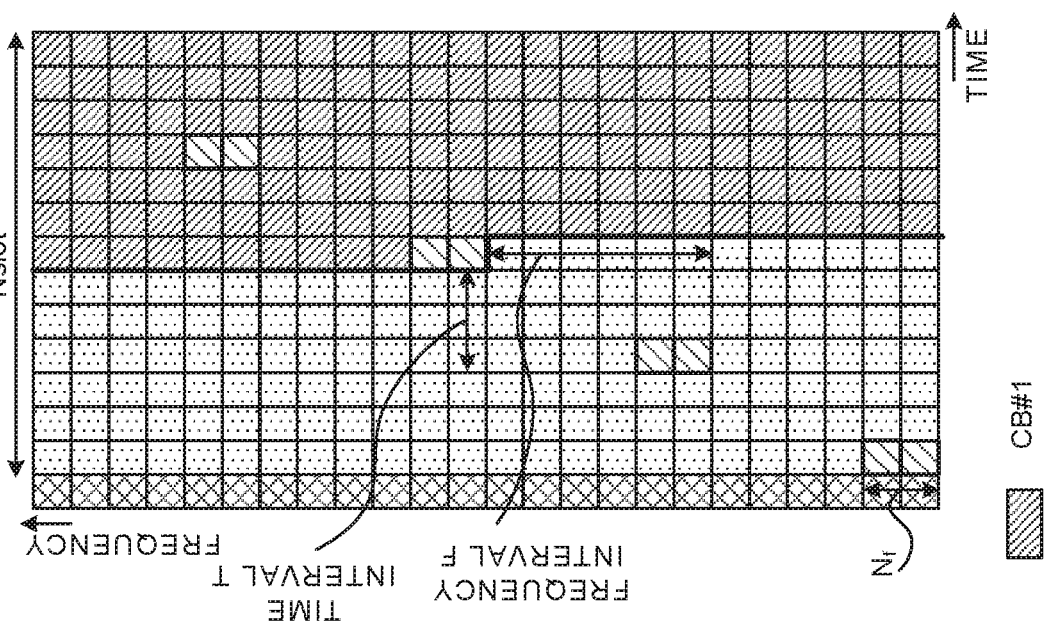
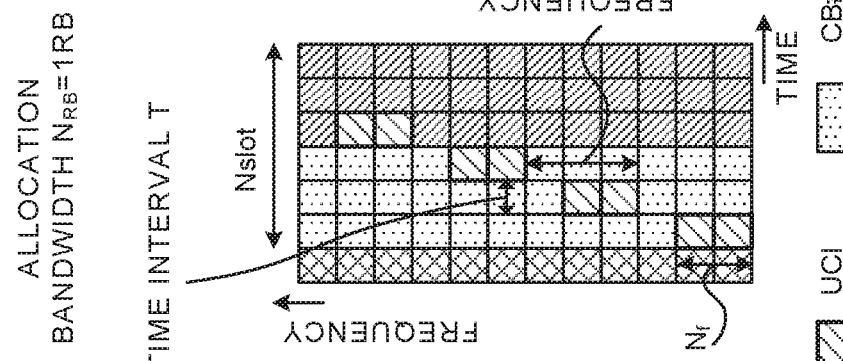
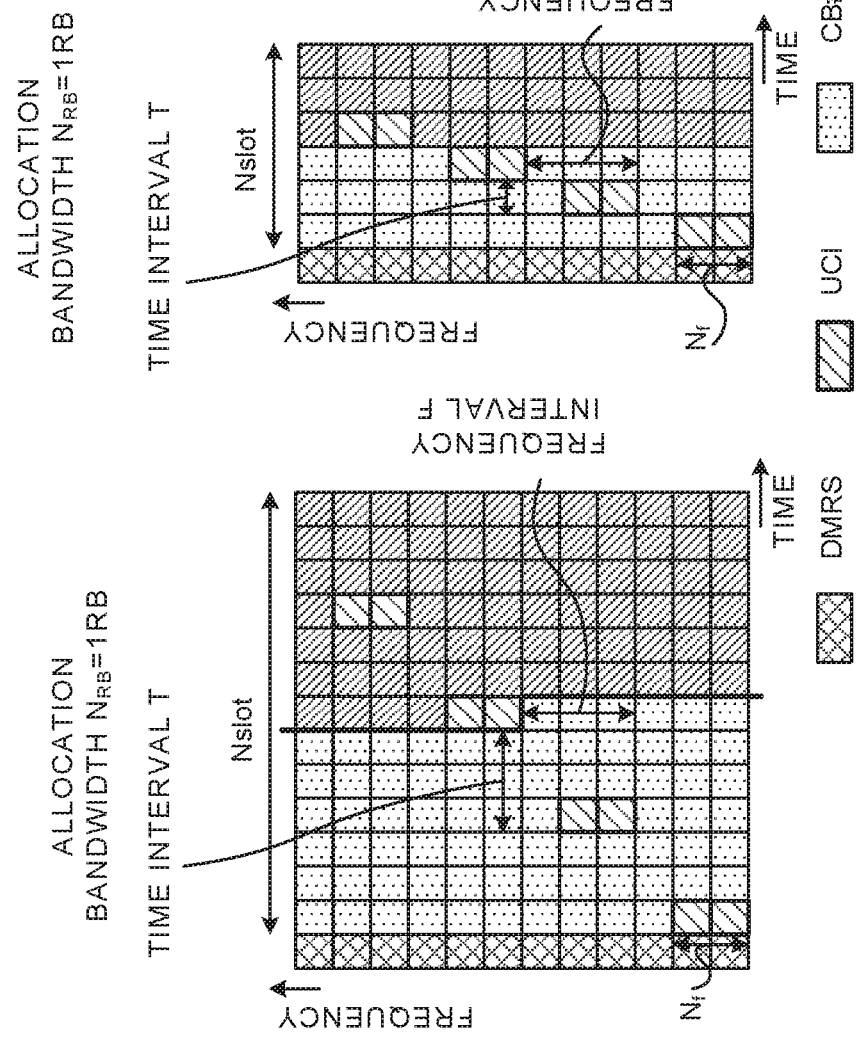

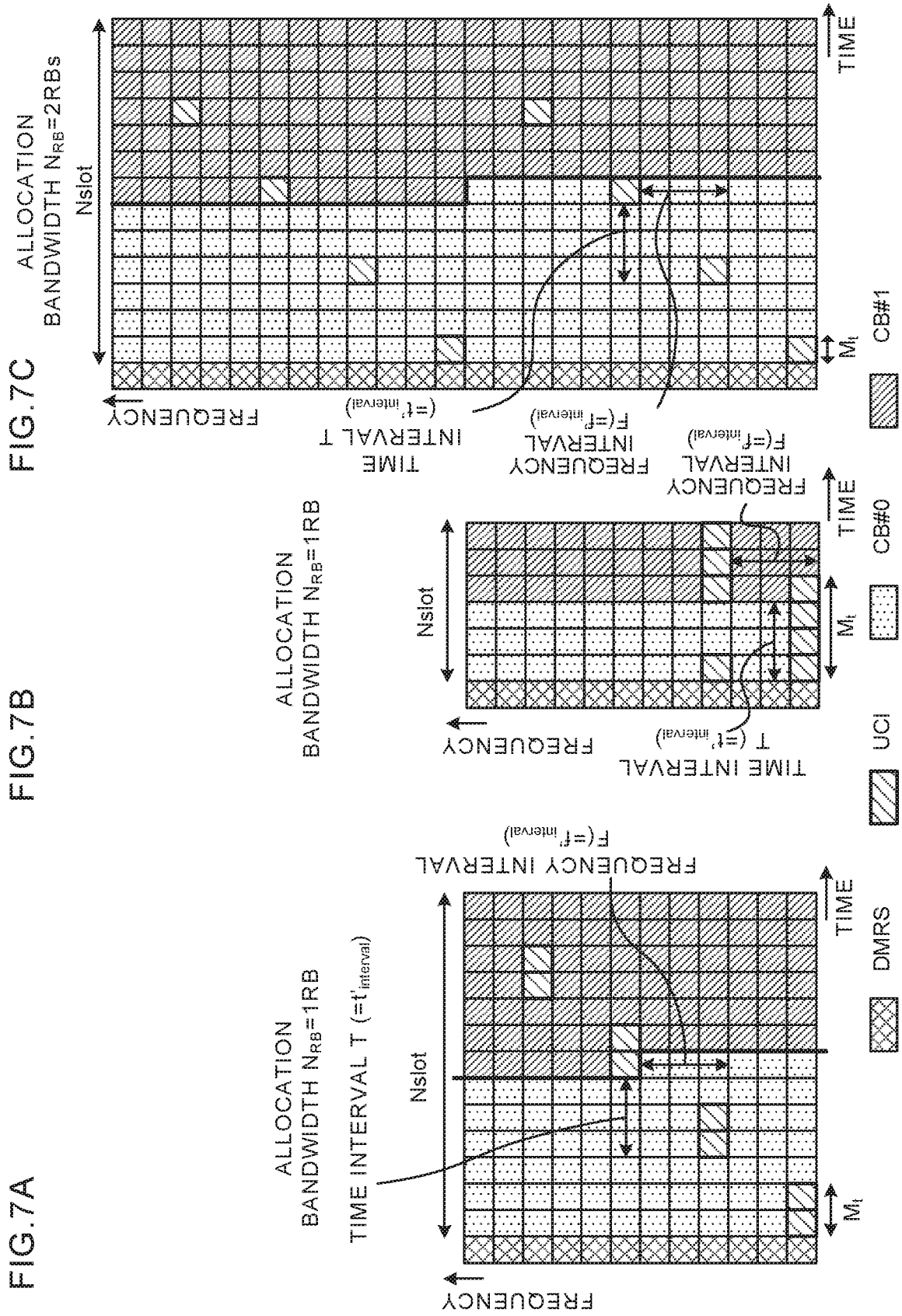

USER TERMINAL AND RADIO COMMUNICATION METHOD

TECHNICAL FIELD

The present invention relates to a user terminal and radio communication method in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of wider bands and higher speed than LTE, successor systems (e.g., also referred to as LTE-Advanced (LTE-A), Future Radio Access (FRA), 4G, 5G, 5G+ (plus), New RAT (NR), LTE Rel.14, 15~, etc.) to LTE have also been studied.

On uplink (UL) in the existing LTE system (e.g., LTE Rel.8-13), Discrete Fourier Transform-Spread-Orthogonal Frequency Division Multiplexing (DFT-s-OFDM) waveforms are supported. The DFT-s-OFDM waveform is a single-carrier waveform, and therefore, it is possible to prevent the Peak to Average Power Ratio (PAPR) from increasing.

Further, in the existing LTE system (e.g., LTE Rel.8-13), a user terminal transmits uplink control information (UCI), using an uplink data channel (e.g., PUSCH: Physical Uplink Shared Channel) and/or uplink control channel (e.g., PUCCH: Physical Uplink Control Channel).

Transmission of the UCI is controlled, based on the presence or absence of configuration of simultaneous PUSCH and PUCCH transmission, and the presence or absence of scheduling of the PUSCH in TTI for transmitting the UCI. Transmission of the UCI using the PUSCH is also called UCI on PUSCH.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Problems to be Solved by the Invention

In the existing LTE system (e.g., LTE Rel.8-13), in the case where transmission of uplink data (e.g., UL-SCH) overlaps with transmission timing of uplink control information (UCI), transmission of the uplink data and UCI is performed using an uplink shared channel (PUSCH) (UCI on PUSCH). Also in the future radio communication system (e.g., LTE Rel.14 onward, 5G or NR), as in the existing LTE system, it is considered that uplink data and UCI is transmitted using the PUSCH.

Further, in the future radio communication system, it was agreed that reference signals (e.g., DMRS: Demodulation Reference Signal) for demodulation of the uplink shared channel are allocated to positions different from those in the existing LTE system in UL transmission. Thus, in the case of applying a configuration different from that in the existing LTE system, it becomes the problem how to control transmission of the uplink control information using the uplink shared channel.

The present invention was made in view of such a respect, and it is an object of the invention to provide a user terminal and radio communication method for enabling communication to be performed properly, also in the case of transmitting uplink data and uplink control information using an uplink shared channel, in the future radio communication system.

Means for Solving the Problem

One aspect of a user terminal of the present invention is characterized by being provided with a transmitting section that transmits uplink data segmented into one or more blocks and uplink control information, using an uplink shared channel, and a control section that controls mapping of the uplink control information in a given time interval and a given frequency interval within a time unit and a bandwidth allocated to the uplink shared channel.

Advantageous Effect of the Invention

According to the present invention, in the future radio communication system, it is possible to properly perform communication, also in the case of transmitting the uplink data and uplink control information using the uplink shared channel.

BRIEF DESCRIPTION OF DRAWINGS

FIG. 1A shows one example of DMRS allocation for PUSCH in the existing LTE system; FIG. 1B shows one example of DMRS allocation in the future radio communication system;

FIGS. 3A and 3B are diagrams showing one example of UCI multiplexing positions (punctured positions) in the case of applying frequency first mapping to uplink data;

FIGS. 4A and 4B are diagrams showing one example of UCI multiplexing positions (punctured positions) in the case of applying time first mapping to uplink data;

FIGS. 6A to 6C are diagrams showing another example of mapping of UCI according to Aspect 1;

FIGS. 7A to 7C are diagrams showing one example of mapping of UCI according to Aspect 2;

BEST MODE FOR CARRYING OUT THE INVENTION

In UL transmission in the existing LTE system, in the case where UCI transmission and uplink data (UL-SCH) transmission occurs at the same timing, supported is the method of multiplexing the UCI and uplink data into a PUSCH (also called UCI piggyback on PUSCH, UCI on PUSCH). By using UCI on PUSCH, it is possible to achieve low Peak-to-Average Power Ratio (PAPR) and/or low inter-modulation distortion (IMD) in UL transmission.

Also in UL transmission in the future radio communication system (e.g., LTE Rel.14 onward, 5G, NR or the like), it has been studied to support UCI on PUSCH.

Further, in the existing LTE system, the demodulation reference signal (also called DMRS: Demodulation Reference Signal) for PUSCH is disposed in two symbols (e.g., 4th symbol and 11th symbol) of a subframe (see FIG. 1A). On the other hand, in the future radio communication system, it was agreed that the DMRS for PUSCH is allocated to the beginning of a subframe (or, slot) in UL transmission (see FIG. 1B). Thus, in the future radio communication system, since the PUSCH configuration different from that in the existing LTE system is applied, it is desired to apply UCI on PUSCH suitable for the PUSCH configuration.

Figure 2:
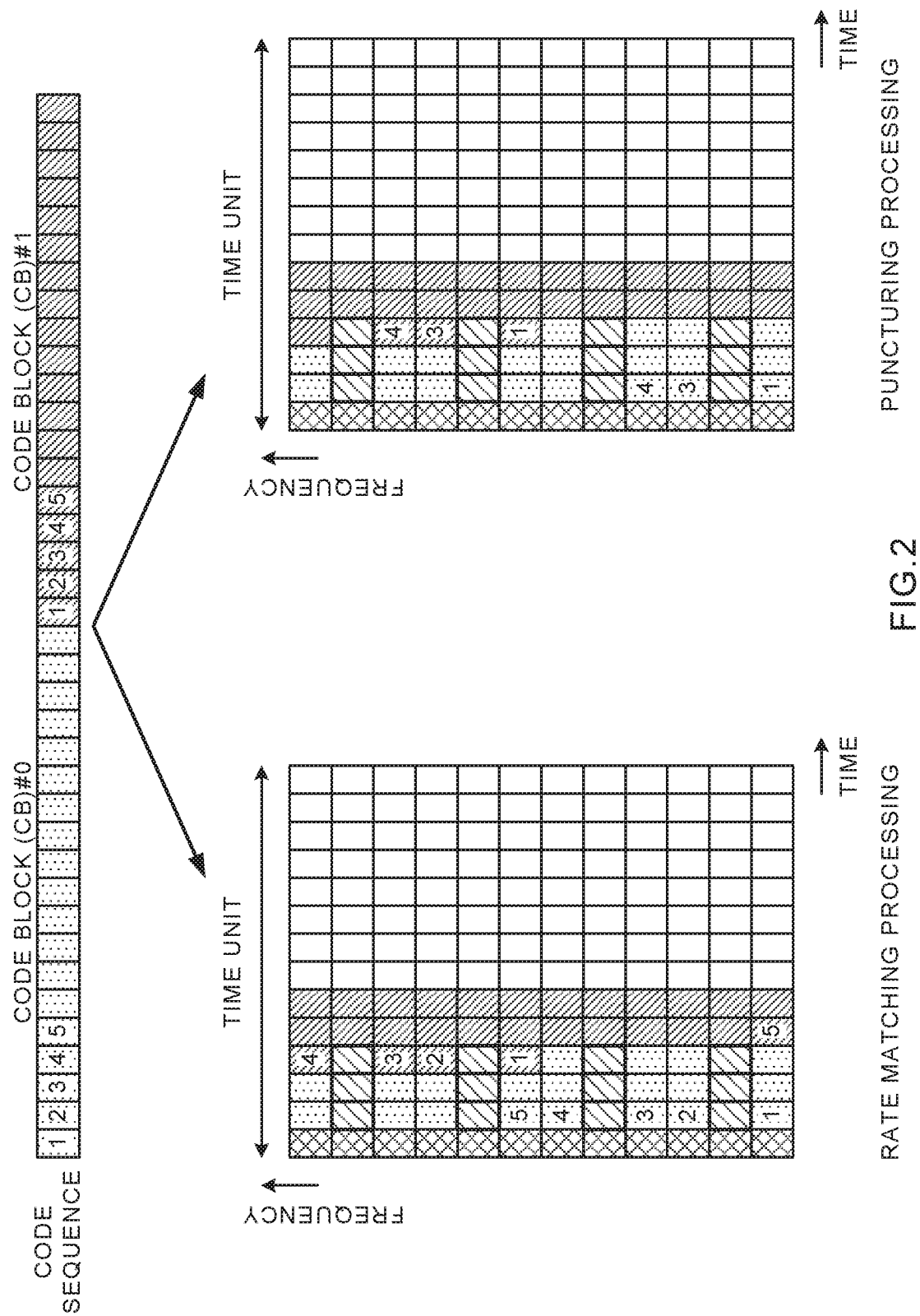
FIG. 2 is a diagram to explain the case of applying rate matching processing and puncturing processing as a mapping method of UCI.

As a method of multiplexing the uplink control information (UCI) on the PUSCH, it is considered that rate matching processing and/or puncturing processing is applied. FIG. 2 illustrates the case of multiplexing the UCI, by applying rate matching processing or puncturing processing to uplink data transmitted in a plurality of code blocks (herein, CB #0 and CB #1).

FIG. 2 illustrates a method of multiplexing the UCI in transmitting uplink data on a code-block (CB)-by-code-block basis on the PUSCH. The CB is a unit configured by segmenting a transport block (TB).

In the existing LTE system, in the case where a transport block size (TBS) exceeds a given threshold (e.g., 6144 bits), the TB is segmented into one or more segments (Code Block (CB)), and coding is performed on a segment-by-segment basis (Code Block Segmentation). Each coded code block is concatenated to transmit. The TBS is a size of the transport block that is a unit of an information bit sequence. One or a plurality of TBs is allocated to one subframe.

The rate matching processing refers to controlling the number of bits (coded bits) subsequent to coding, in consideration of actually usable radio resources. In other words, a coding rate of uplink data is varied to control, corresponding to the number of pieces of UCI to multiplex (see FIG. 2). Specifically, as shown in FIG. 2, it is controlled that a sequence (1-5) of each CB is not allocated to multiplexing positions of the UCI. By this means, although it is possible to multiplex without disturbing the code sequence of the uplink data, unless a radio base station and user terminal do not share the multiplexing position of the UCI, it is not possible to correctly obtain the data.

Further, in the puncturing processing, coding is performed on the premise that resources allocated to the data are usable, and the processing refers to that any coded symbol is not mapped to the resource (e.g., resource for UCI) that is not usable actually (the resource is made vacant.) In other words, the UCI is rewritten into the code sequence of mapped uplink data (see FIG. 2). Specifically, as shown in FIG. 2, irrespective of whether the position is the multiplexing position of the UCI, the sequence (1-5) of the CB is allocated, and the sequence (2, 5) into which the UCI is multiplexed is overwritten with the UCI. By this means, since positions of the other code sequence are not disturbed, even when the variance of UCI multiplexing occurs between the radio base station and the user terminal, it is made easy to correctly obtain the data.

In the future radio communication system, it is expected to apply at least the puncturing processing to UCI on PUSCH. However, in the case of applying the puncturing processing, the problem occurs that an error rate of uplink data deteriorates, as the number of punctured symbols increases.

In the future radio communication system, it is studied to perform retransmission control on a basis of group (code block group) containing the TB or one or more CBs. Accordingly, the radio base station performs error detection for each CB on the uplink data transmitted from the user terminal, and performs transmission of ACK/NACK for each of all CBs (TB) or CBG (a plurality of CBs). Therefore, when an error rate of a particular CB deteriorates, any CB that is properly received in the radio base station is also transmitted, and there is the risk that problems occur such as increases in overhead and/or delay or the like.

For example, as shown in FIG. 3A, when the UCI is multiplexed into contiguous time regions, the number of punctures of a particular CB (herein CB #1) is increased, and variations occur in the number of punctures among a plurality of CBs. Further, as shown in FIG. 3B, when the UCI is multiplexed into contiguous frequency regions, the number of punctures of a particular CB (herein CB #1) is increased. In addition, FIG. 3 illustrates the case where the uplink data (CB) is first mapped in the frequency domain, and is then mapped in the time domain (application of frequency first mapping).

Further, the case is considered similarly where the uplink data is first mapped in the time domain, and is then mapped in the frequency domain (application of time first mapping) (see FIG. 4). FIG. 4A illustrates the case of multiplexing the UCI into contiguous time regions, and FIG. 4B illustrates the case of multiplexing the UCI into contiguous frequency regions. In FIGS. 4A and 4B, the number of punctures of a particular CB (herein CB #1) is increased, and variations occur in the number of punctures among a plurality of CBs.

In the cases as shown in FIGS. 3 and 4, as compared with CB #2, the error rate of CB #1 such that the number of punctured resources is high deteriorates, and the probability is high that the radio base station sides misses reception of CB #1. In the case where the CB #1 and CB #2 are contained in the same TB or CBG, and the radio base station misses reception of only the CB #1, it is necessary to retransmit also the CB #2, and due to increases in overhead and generation of delay, there is the risk that the communication quality deteriorates.

Therefore, the inventors of the present invention noted the respect that in the case of transmitting uplink data segmented into one or more CBs (blocks) and UCI using a PUSCH (uplink shared channel), by mapping the UCI in a given time interval T and given frequency interval F within a time unit and a bandwidth allocated to the PUSCH, it is possible to distribute the UCI over the CB, and arrived at the invention.

This Embodiment will be described below in detail. In addition, in this Embodiment, the UCI may include at least one of a scheduling request (SR), receipt confirmation information (also referred to as HARQ-ACK: Hybrid Automatic Repeat reQuest-Acknowledge, ACK or NACK (Negative ACK), A/N or the like) to a downlink data channel (e.g., PDSCH: Physical Downlink Shared Channel)), channel state information (CSI), beam index information (BI: Beam Index), and buffer status report (BSR).

In addition, in the following description, the case is shown where two or three CBs are mapped in a time unit to which the PUSCH is allocated, and the number of CBs mapped to the time unit may be one or more. Further, this Embodiment may be applied to a given block except the CB.

In this Embodiment, the user terminal transmits the uplink data segmented into one or blocks (e.g., CB) and UCI, using the uplink shared channel (e.g., PUSCH). The user terminal controls mapping of the UCI in a given time interval and given frequency interval in time resources (e.g., slot and/or mini-slot) and frequency resources (e.g., RB) allocated to the uplink shared channel.

(Aspect 1)

In Aspect 1, the user terminal controls a position (e.g., resource element (RE)) to which the UCI is mapped, based on a time length (e.g., slot length, mini-slot length or the number of symbols) of a time unit and/or a bandwidth (e.g., the number of RBs) allocated to the PUSCH.

Specifically, the user terminal may control a time interval T to which the UCI is mapped, based on the time length (allocation time length) of the time unit (e.g., slot or mini-slot) allocated to the PUSCH. Further, the user terminal may control a frequency interval F to which the UCI is mapped, based on the bandwidth (allocation bandwidth) allocated to the PUSCH.

In Aspect 1, for example, a time position $t_{UCI}$ and frequency position $f_{UCI}$ to which the UCI is mapped may be expressed by the following equations 1 and 2. For example, the time position $t_{UCI}$ may be a symbol index. Further, the frequency position $f_{UCI}$ may be a subcarrier index.

[Mathematics 1]

$$t_{UCI} = \left\{ (n \bmod N_t) + \left\lfloor \frac{n}{N_t} \right\rfloor \left\lfloor t_{interval} \frac{N_{Slot}}{N_{Max\_slot}} \right\rfloor \right\} \bmod N_{slot} \quad \text{(Equation 1)}$$

$$f_{UCI} \left\{ \left\lfloor \frac{n}{N_t} \right\rfloor \left\lfloor f_{interval} \frac{N_{RB}}{N_{Min\_RB}} \right\rfloor \right\} \bmod (N_{RB} N_{SC}) \quad \text{(Equation 2)}$$

In the above-mentioned equations 1 and 2, n represents an nth UCI symbol. $N_t$ represents the contiguous number (arbitrary constant) in the time domain to which the UCI is mapped.

Further, in the above-mentioned equation 1, $t_{interval}$ represents a time interval (reference time interval) serving as the reference, and for example, may be a maximum time interval. $N_{Max\_slot}$ represents a time length (reference time length) of a time unit serving as the reference, and for example, may be a maximum slot length or the number of symbols. $N_{slot}$ represents an allocation time length to the PUSCH, and for example, is a slot length, mini-slot length, the number of symbols or the like.

Furthermore, in the above-mentioned equation 2, $f_{interval}$ represents a frequency interval (reference frequency interval) serving as the reference, and for example, may be a minimum frequency interval. $N_{min\_RB}$ represents a bandwidth (reference bandwidth) serving as the reference, and for example, may be the minimum number of RBs. $N_{RB}$ represents an allocation bandwidth to the PUSCH, and for example, may be the number of RBs. $N_{SC}$ is the number of subcarriers per RB.

The time interval T with the UCI mapped thereto may be controlled, based on at least one of the allocation time length $N_{slot}$ to the PUSCH, reference time length $N_{Max\_slot}$ and reference time interval $t_{interval}$. For example, in the above-mentioned equation 1, the time interval T is controlled, based on the reference time interval $t_{interval}$ and a ratio between the reference time length $N_{Max\_slot}$ and the allocation time length $N_{slot}$.

The frequency interval F with the UCI mapped thereto may be controlled, based on at least one of the allocation bandwidth $N_{RB}$ to the PUSCH, reference bandwidth $N_{min\_RB}$, and reference frequency interval $f_{interval}$. For example, in the above-mentioned equation 2, the frequency interval F is controlled, based on the reference frequency interval $f_{interval}$ and a ratio between the reference bandwidth $N_{min\_RB}$ and the allocation bandwidth $N_{RB}$.

In addition, the above-mentioned equations 1 and 2 are only illustrative, and the time position $t_{UCI}$ and frequency position $f_{UCI}$ to which the UCI is mapped may be expressed by another equation using at least one of parameters shown in the above-mentioned equations 1 and 2. Further, an additional parameter may be considered. For example, the above-mentioned equations 1 and 2 are described without considering the DMRS, but at least one of a parameter, constant, index and equation may be used in consideration of the DMRS.

Figure 5A:
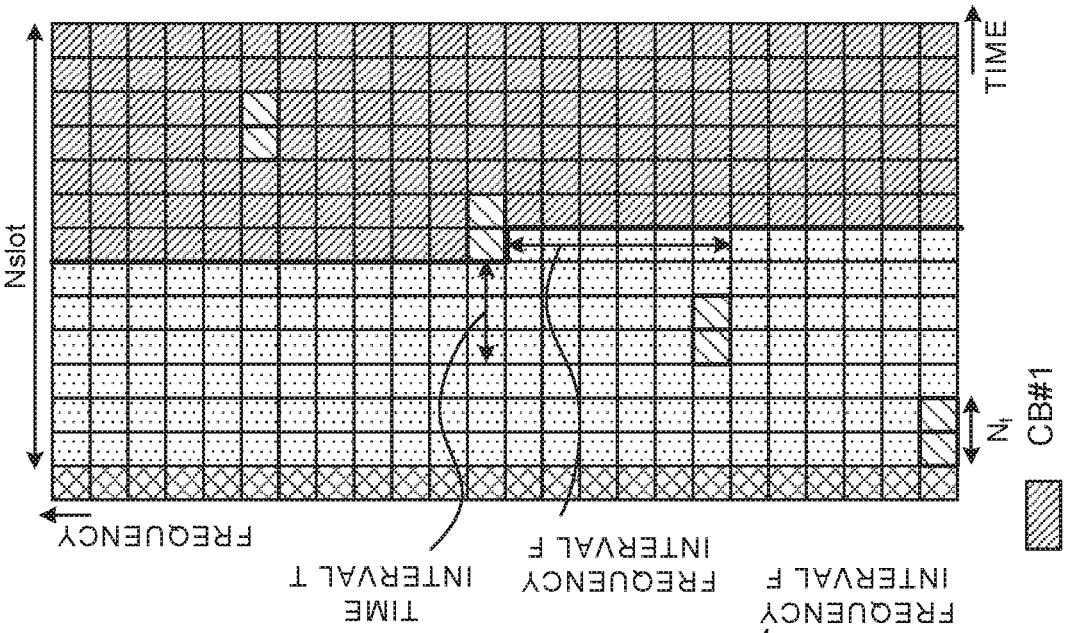
FIGS. 5A to 5C are diagrams showing one example of mapping of UCI according to Aspect 1.
Figure 5B:
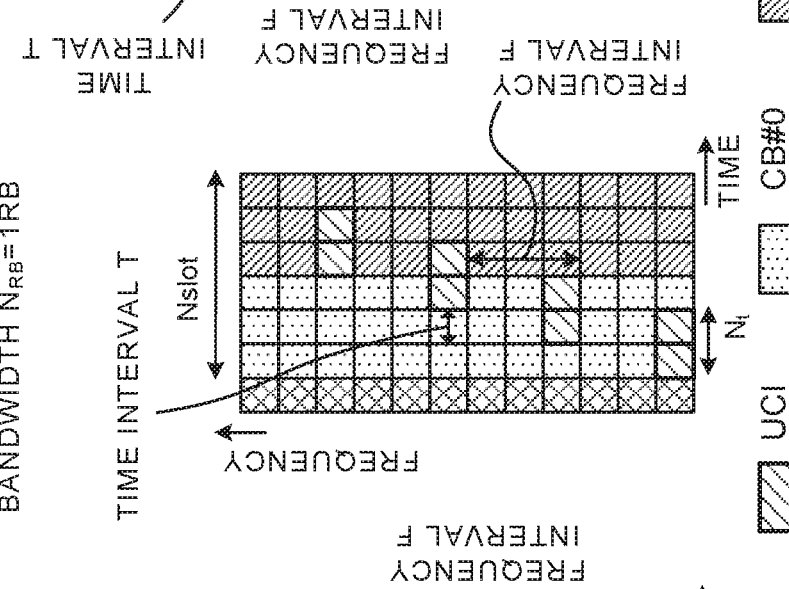
Figure 5C:
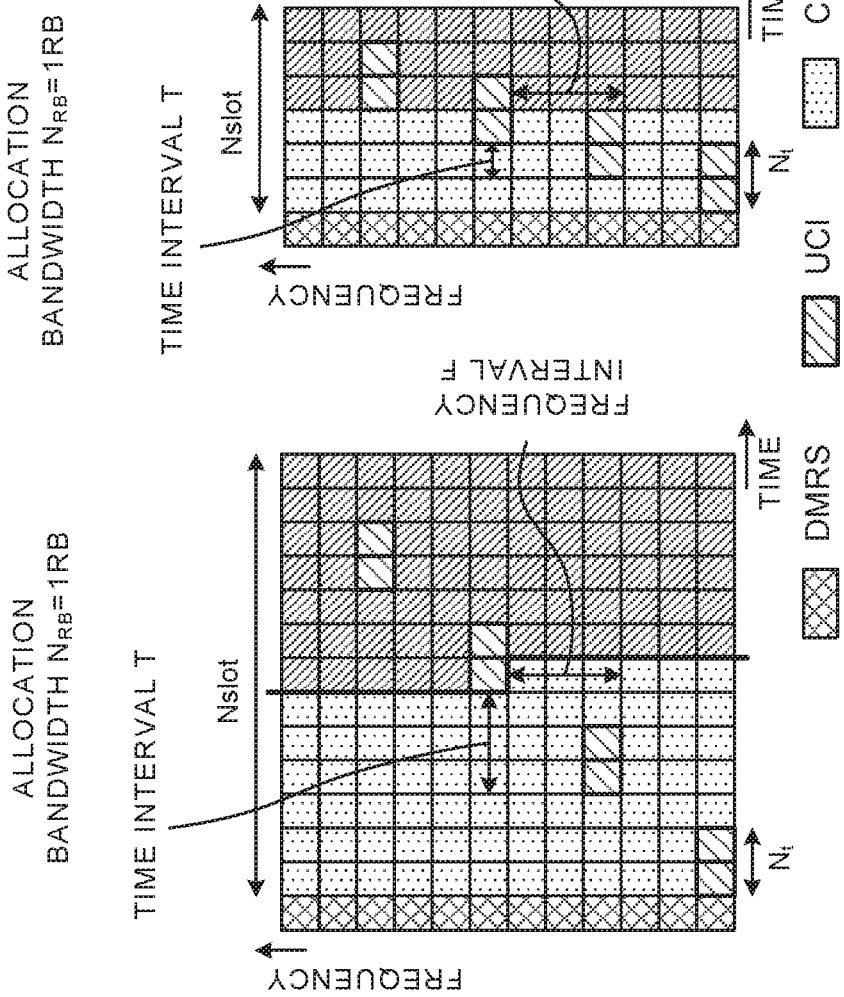

FIG. 5 contains diagrams showing one example of mapping of UCI according to Aspect 1. FIGS. 5A to 5C illustrate configurations where the reference signal (DMRS) for demodulation of PUSCH is allocated to a first region (e.g., first symbol) of a time unit (e.g., slot or mini-slot). In addition, the number of symbols and/or positions where the DMRS is allocated are not limited to the configurations shown in FIGS. 5A to 5C.

Further, FIGS. 5A to 5C illustrate the case where the uplink data is segmented into two CBs (CB #0 and CB #1) and is subjected to frequency first mapping, as one example. Further, in FIGS. 5A to 5C, as a method of multiplexing CBs #0 and #1 and UCI, it is assumed to apply puncturing processing and/or rate matching processing.

FIGS. 5A to 5C show one example where the contiguous number $N_t$ in the time domain where the UCI is mapped is "2", the reference time interval $t_{interval}$ is 3 symbols, the reference time length $N_{Max\_slot}$ is 13 symbols, the reference frequency interval $f_{interval}$ is 3 subcarriers, the reference bandwidth $N_{min\_RB}$ is 1 RB, and $N_{SC}$ is 12 subcarriers. In addition, in FIGS. 5A to 5C, it is assumed that the mapping position of UCI is controlled using the above-mentioned equations 1 and 2, but the invention is not limited thereto.

In FIG. 5A, the allocation time length $N_{slot}$ to the PUSCH is 13 symbols (except the DMRS symbol), and is equal to the reference time length $N_{Max\_slot}$. Therefore, the time interval T with the UCI mapped thereto is controlled to be equal to the reference time interval $t_{interval}$ (=3 symbols). Further, the allocation bandwidth $N_{RB}$ to the PUSCH is 1RB, and is equal to the reference bandwidth $N_{min\_RB}$. Therefore, the frequency interval F with the UCI mapped thereto is controlled to be equal to the reference frequency interval $f_{interval}$ (=3 subcarriers).

On the other hand, in FIG. 5B, the allocation time length $N_{slot}$ to the PUSCH is 6 symbols (except the DMRS symbol), and is smaller than the reference time length $N_{Max\_slot}$.

Therefore, the time interval T with the UCI mapped thereto is controlled to be shorter than the reference time interval $t_{interval}$ (=3 symbols). In addition, the frequency interval F is controlled as in FIG. 5A.

Further, in FIG. 5C, the allocation bandwidth $N_{RB}$ to the PUSCH is 2RBs, and is twice the reference bandwidth $N_{min\_RB}$ (=1RB). Therefore, the frequency interval F with the UCI mapped thereto is controlled to be 6 subcarriers that are twice the reference frequency interval $f_{interval}$ (=3 subcarriers). In addition, the time interval T is controlled as in FIG. 5A.

As described above, in Aspect 1, the time interval T and/or frequency interval F with the UCI mapped thereto is controlled, based on the allocation time length ($N_{Slot}$) and/or the allocation bandwidth ($N_{RB}$) to the PUSCH. Therefore, also in the case of segmenting uplink data into a plurality of CBs, it is possible to distribute REs where the UCI is mapped to the plurality of RBs, and it is possible to decrease characteristic differences among the plurality of CBs due to mapping of the UCI. Further, it is possible to obtain frequency diversity effects on the UCI corresponding to the allocation bandwidth ($N_{RB}$) to the PUSCH.

In addition, the above-mentioned Aspect 1 describes the example where the UCI is mapped to the given number $N_t$ of REs contiguous in the time domain, and the UCI may be mapped to the given number $N_f$ of REs contiguous in the frequency domain. In this case, for example, the time position $t_{UCI}$ and frequency position $f_{UCI}$ to which the UCI is mapped may be expressed by the following equations 3 and 4.

[Mathematics 2]

$$t_{UCI} = \left\{ \left\lfloor \frac{n}{N_f} \right\rfloor \left\lfloor t_{interval} \frac{N_{Slot}}{N_{Max\_slot}} \right\rfloor \right\} \bmod N_{slot} \quad \text{(Equation 3)}$$

$$f_{UCI} = \left\{ (n \bmod N_f) + \left\lfloor \frac{n}{N_f} \right\rfloor \left\lfloor f_{interval} \frac{N_{RB}}{N_{Min\_RB}} \right\rfloor \right\} \bmod (N_{RB} N_{SC}) \quad \text{(Equation 4)}$$

In the above-mentioned equations 3 and 4, $N_f$ represents the contiguous number (arbitrary constant) in the frequency domain to which the UCI is mapped. In addition, the other parameters are as described in the above-mentioned equations 1 and 2. According to the above-mentioned equations 3 and 4, for example, in the case of $N_f$=2, as shown in FIGS. 6A to 6C, the UCI is mapped to two contiguous subcarriers of the same symbol. In addition, the precondition in FIGS. 6A to 6C is the same as in FIGS. 5A to 5C.

(Aspect 2)

In Aspect 2, the user terminal controls the contiguous number of REs to which UCI is mapped, based on a time length (e.g., slot length, mini-slot length or the number of symbols) of a time unit and/or bandwidth (e.g., the number of RBs) allocated to the PUSCH.

Specifically, the user terminal may control the contiguous number in the time domain to which the UCI is mapped, based on the allocation time length and/or the allocation bandwidth to the PUSCH.

In Aspect 2, for example, a time position $t_{UCI}$ and frequency position $f_{UCI}$ to which the UCI may be expressed by the following equations 5 to 7. For example, the time position $t_{UCI}$ may be a symbol index. Further, the frequency position $f_{UCI}$ may be a subcarrier index.

[Mathematics 3]

$$t_{UCI} = \left\{ (n \bmod M_t) + \left\lfloor \frac{n}{M_t} \right\rfloor t'_{interval} \right\} \bmod N_{slot} \quad \text{(Equation 5)}$$

$$f_{UCI} = \left\{ \left\lfloor \frac{n}{M_t} \right\rfloor f'_{interval} \right\} \bmod (N_{RB} N_{SC}) \quad \text{(Equation 6)}$$

$$M_t = \left\lfloor N'_t \frac{N_{Min\_RB}}{N_{RB}} \frac{N_{Max\_slot}}{N_{Slot}} \right\rfloor \quad \text{(Equation 7)}$$

In the above-mentioned equations 5 and 6, $M_t$ represents the contiguous number in the time domain to which the UCI is mapped. In the above-mentioned equation 7, $N'_t$ represents the contiguous number (reference contiguous number) in the time domain serving as the reference, and for example, may be the contiguous number in the reference time length $N_{Max\_slot}$ and reference bandwidth $N_{min\_RB}$.

Further, in the above-mentioned equation 5, $t'_{interval}$ represents a given time interval T. In Aspect 2, $t'_{interval}$ is an arbitrary constant, and differs from Aspect 1, in the respect that the time interval T is not controlled based on the allocation time length $N_{slot}$.

Furthermore, in the above-mentioned equation 6, $f'_{interval}$ represents a given frequency interval F. In Aspect 2, $f'_{interval}$ is an arbitrary constant, and differs from Aspect 1, in the respect that the frequency interval F is not controlled based on the allocation bandwidth $N_{RB}$. The other parameters in the above-mentioned equations 5 to 7 are as described in the above-mentioned equations 1 and 2.

The contiguous number $M_t$ in the time domain with the UCI mapped thereto may be controlled, based on at least one of the reference contiguous number $N'_t$, allocation bandwidth $N_{RB}$ to the PUSCH, allocation time length $N_{slot}$, reference bandwidth $N_{min\_RB}$, and reference time length $N_{Max\_slot}$. For example, in the above-mentioned equation 7, the contiguous number $M_t$ in the time domain is controlled, based on the reference contiguous number $N'_t$, a ratio between the reference bandwidth $N_{min\_RB}$ and the allocation bandwidth $N_{RB}$, and a ratio between the reference time length $N_{Max\_slot}$ and the allocation time length $N_{slot}$.

In addition, the above-mentioned equations 5 to 7 are only illustrative, and the time position $t_{UCI}$ and frequency position $f_{UCI}$ to which the UCI is mapped may be expressed by another equation using at least one of parameters shown in the above-mentioned equations 5 to 7. Further, an additional parameter may be considered. For example, the above-mentioned equations 5 to 7 are described without considering the DMRS, but at least one of a parameter, constant, index and equation may be used in consideration of the DMRS.

FIG. 7 contains diagrams showing one example of mapping of UCI according to Aspect 2. In addition, in FIGS. 7A to 7C, different points from FIGS. 5A to 5C will mainly be described.

FIGS. 7A to 7C show one example where the reference contiguous number $N'_t$ is "2", the time interval $t'_{interval}$ (=given time interval T) with the UCI mapped thereto is 3 symbols, the reference time length $N_{Max\_slot}$ is 13 symbols, the frequency interval $f'_{interval}$ (=given frequency interval F) with the UCI mapped thereto is 3 subcarriers, the reference bandwidth $N_{min\_RB}$ is 1 RB, and $N_{SC}$ is 12 subcarriers. In addition, in FIGS. 7A to 7C, it is assumed that the mapping position of UCI is controlled using the above-mentioned equations 5 to 7, but the invention is not limited thereto.

In FIG. 7A, the allocation time length $N_{slot}$ to the PUSCH is 13 symbols (except the DMRS symbol), and is equal to the reference time length $N_{Max\_slot}$. Further, the allocation bandwidth $N_{RB}$ to the PUSCH is 1RB, and is equal to the reference bandwidth $N_{min\_RB}$. Therefore, the contiguous number $M_t$ in the time domain with the UCI mapped thereto is controlled to be equal to the reference contiguous number $N'_t$ (=2 symbols).

On the other hand, in FIG. 7B, the allocation time length $N_{slot}$ to the PUSCH is 6 symbols (except the DMRS symbol), and is smaller than the reference time length $N_{Max\_slot}$. In this case, according to the above-mentioned equation 7, the contiguous number $M_t$ in the time domain with the UCI mapped thereto is controlled to be "4" that is twice the reference contiguous number $N'_t$ (=2 symbols). Thus, as the allocation time length $N_{slot}$ is smaller than the reference time length $N_{Max\_slot}$, the contiguous number $M_t$ may be controlled to increase, or may be controlled to decrease.

In addition, in the case where the nth UCI symbol is the last symbol of a slot, an n+1th UCI symbol may be cycled to a first usable symbol of the slot. For example, in FIG. 7B, since a 7th UCI symbol is the last symbol of the slot, an 8th UCI symbol is the first symbol with the DMRS symbol omitted of the slot.

Further, in FIG. 7C, the allocation bandwidth $N_{RB}$ to the PUSCH is 2RBs, and is twice the reference bandwidth $N_{min\_RB}$. In this case, according to the above-mentioned equation 7, the contiguous number $M_t$ in the time domain with the UCI mapped thereto is controlled to be "1" that is one-half the reference contiguous number $N'_t$ (=2 symbols). Thus, as the allocation bandwidth $N_{RB}$ is larger than the reference bandwidth $N_{min\_RB}$, the contiguous number $M_t$ may be controlled to decrease, or may be controlled to increase.

As described above, in Aspect 2, the contiguous number $M_t$ in the time domain with the UCI mapped thereto is controlled, based on the allocation time length ($N_{slot}$) and/or allocation bandwidth ($N_{RB}$) to the PUSCH. Also in the case of segmenting uplink data into a plurality of CBs, it is possible to distribute REs where the UCI is mapped to the plurality of RBs, and it is possible to decrease characteristic differences among the plurality of CBs due to mapping of the UCI.

Further, in Aspect 2, it is possible to obtain frequency diversity effects on the UCI corresponding to the allocation bandwidth ($N_{RB}$). Further, also when the allocation time length ($N_{slot}$) and/or the allocation bandwidth ($N_{RB}$) is varied, since the time interval T and/or frequency interval F with the UCI mapped thereto is certain, it is possible to simplify control.

In addition, the above-mentioned Aspect 2 describes the example where the contiguous number $M_t$ is controlled in the time domain to which the UCI is mapped, and the contiguous number $M_f$ may be controlled in the frequency domain to which the UCI is mapped. In this case, for example, the time position $t_{UCI}$ and frequency position $f_{UCI}$ to which the UCI is mapped may be expressed by the following equations 8 to 10.

[Mathematics 4]

$$t_{UCI} = \left\{ \left\lfloor \frac{n}{M_f} \right\rfloor t'_{interval} \right\} \mod N_{slot} \quad \text{(Equation 8)}$$

$$f_{UCI} = \left\{ (n \mod N_f) + \left\lfloor \frac{n}{M_f} \right\rfloor f'_{interval} \right\} \mod(N_{RB} N_{SC}) \quad \text{(Equation 9)}$$

$$M_f = \left\lfloor N'_f \frac{N_{Min\_RB}}{N_{RB}} \frac{N_{Max\_slot}}{N_{Slot}} \right\rfloor \quad \text{(Equation 10)}$$

Figure 8A:
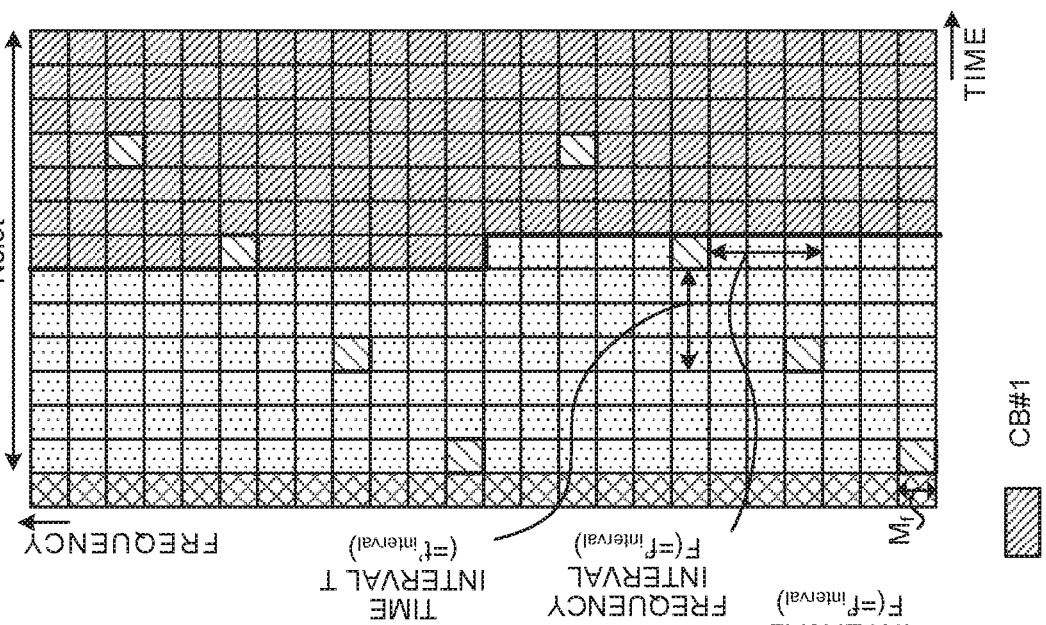
FIGS. 8A to 8C are diagrams showing another example of mapping of UCI according to Aspect 2.
Figure 8B:
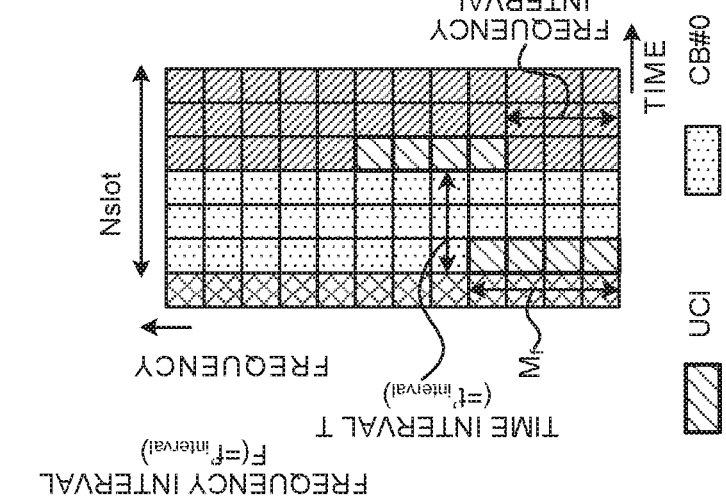
Figure 8C:
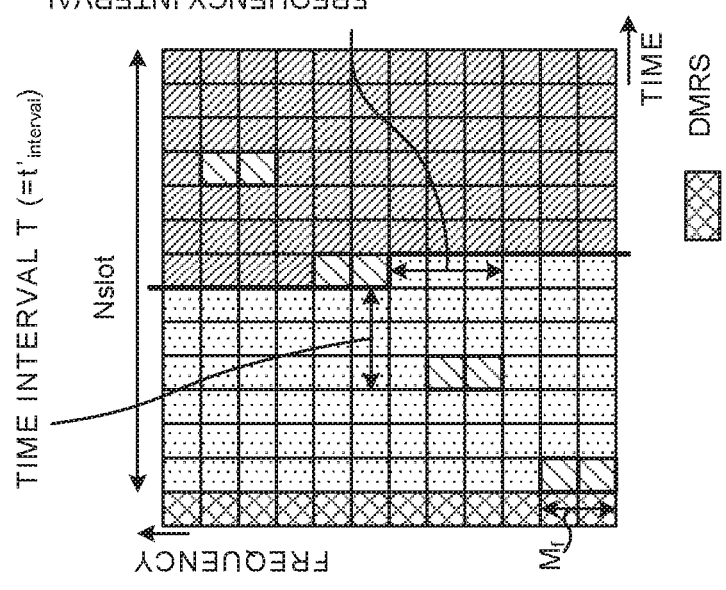

In the above-mentioned equations 8 to 10, $M_f$ represents the contiguous number in the frequency domain to which the UCI is mapped, and for example, is expressed by the equation 10. In the above-mentioned equation 10, $N'_f$ represents the contiguous number (reference contiguous number) in the frequency domain serving as the reference, and for example, may be the contiguous number in the frequency domain in the reference time length $N_{Max\_slot}$ and reference bandwidth $N_{min\_RB}$. According to the above-mentioned equations 8 to 10, for example, in the case of $N'_f=2$, in FIG. 8A, the UCI is mapped to two contiguous subcarriers of the same symbol, and in FIG. 8B, is mapped to four contiguous subcarriers of the same symbol. In addition, the precondition in FIGS. 8A to 8C is the same as in FIGS. 7A to 7C.

(Aspect 3)

In Aspect 3, the user terminal controls the number (e.g., total number) of REs to which UCI is mapped, based on a time length (e.g., slot length, mini-slot length or the number of symbols) of a time unit and/or bandwidth (e.g., the number of RBs) allocated to the PUSCH. It is possible to combine Aspect 3 and Aspect 1 or Aspect 2.

Specifically, the total number of REs with the UCI mapped thereto may be controlled, based on at least one of the number of REs (reference RE number) serving as the reference, allocation bandwidth $N_{RB}$ to the PUSCH, allocation time length $N_{slot}$, reference bandwidth $N_{min\_RB}$, and reference time length $N_{Max\_slot}$. For example, the total number of REs may be controlled, based on the reference RE number, a ratio between the reference bandwidth $N_{min\_RB}$ and the allocation bandwidth $N_{RB}$, and a ratio between the reference time length $N_{Max\_slot}$ and the allocation time length $N_{slot}$.

Figure 9C:
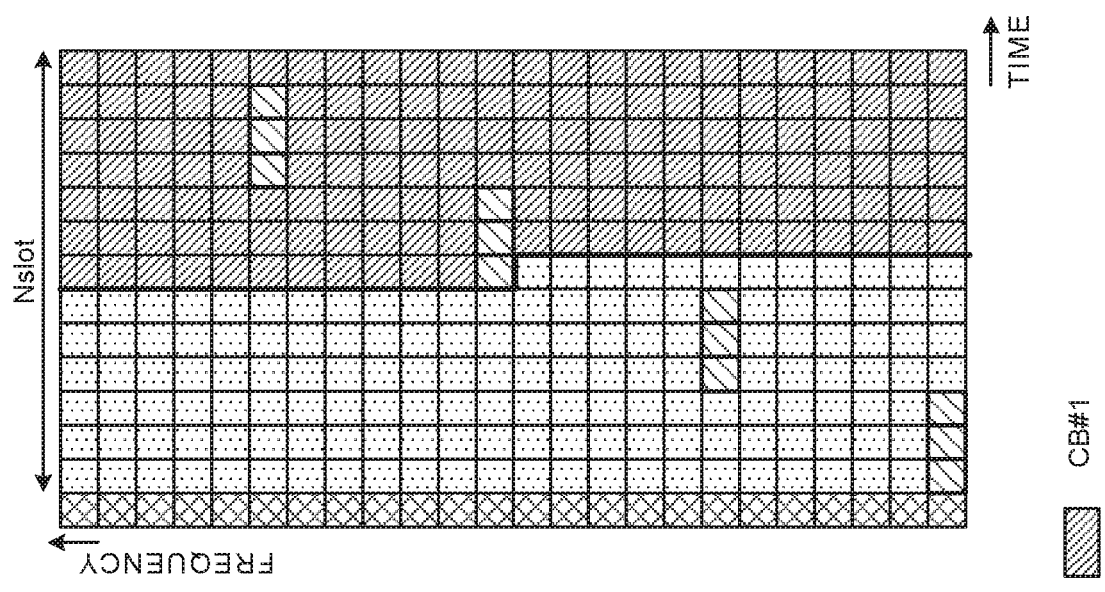
FIGS. 9A to 9C are diagrams showing one example of mapping of UCI according to Aspect 2.
Figure 9B:
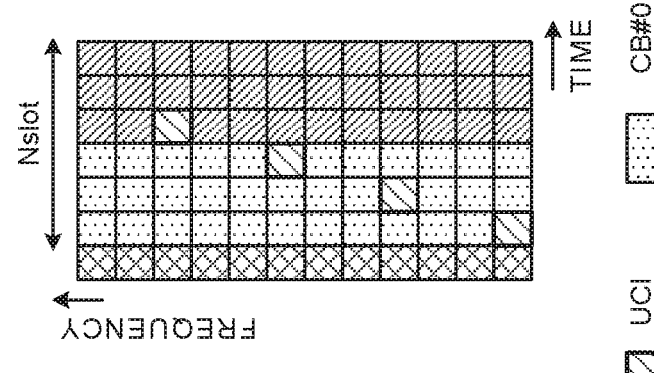
Figure 9A:
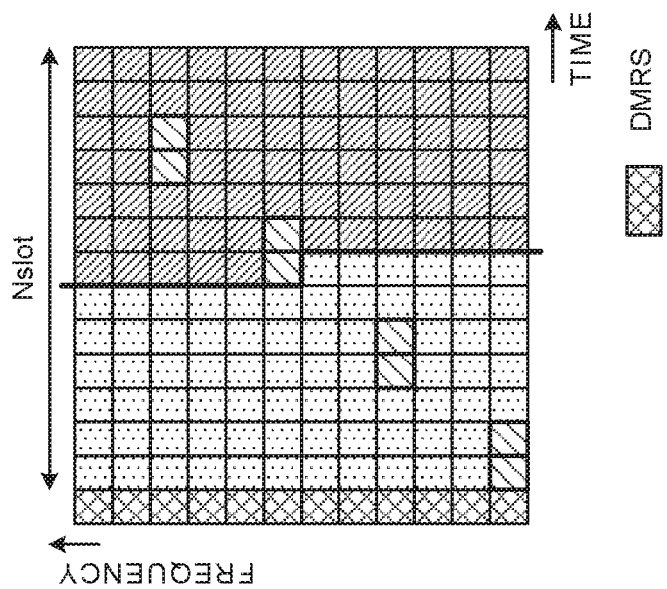

FIG. 9 contains diagrams showing one example of mapping of UCI according to Aspect 3. In addition, in FIGS. 9A to 9C, different points from FIGS. 5A to 5C and FIGS. 7A to 7C will mainly be described.

FIGS. 9A to 9C show one example where the reference RE number is "8", the reference time length $N_{Max\_slot}$ is 13 symbols, the reference bandwidth $N_{min\_RB}$ is 1 RB, and $N_{SC}$ is 12 subcarriers.

In FIG. 9A, the allocation time length $N_{slot}$ to the PUSCH is 13 symbols (except the DMRS symbol), and is equal to the reference time length $N_{Max\_slot}$. Further, the allocation bandwidth $N_{RB}$ to the PUSCH is 1RB, and is equal to the reference bandwidth $N_{min\_RB}$. Therefore, the total number of REs with the UCI mapped thereto may be controlled to be equal to the reference RE number (=8).

On the other hand, in FIG. 9B, the allocation time length $N_{slot}$ to the PUSCH is 6 symbols (except the DMRS symbol), and is smaller than the reference time length $N_{Max\_slot}$. In this case, the total number of REs with the UCI mapped thereto may be controlled to be "4" that is one-half the reference RE number (=8). Thus, the total number of REs with the UCI mapped thereto may be controlled to decrease, as the allocation time length $N_{slot}$ is smaller than the reference time length $N_{Max\_slot}$.

Further, in FIG. 9C, the allocation bandwidth $N_{RB}$ to the PUSCH is 2RBs, and is twice the reference bandwidth $N_{min\_RB}$. In this case, the total number of REs with the UCI mapped thereto may be controlled to be "12" that is higher than the reference RE number (=8). Thus, the total number of REs with the UCI mapped thereto may be controlled to increase, as the allocation time length $N_{slot}$ is larger than the reference time length $N_{Max\_slot}$.

As described above, in Aspect 3, the total number of REs with the UCI mapped thereto is controlled, based on the allocation time length ($N_{slot}$) and/or the allocation bandwidth ($N_{RB}$) to the PUSCH. Therefore, it is possible to configure characteristics of the PUSCH and UCI with balance (it is possible to control so that both of the PUSCH and the UCI meet required error rates).

(Other Aspects)

In the above-mentioned Aspects 1 to 3, it is assumed that the puncturing processing is applied, as the method of multiplexing one or more CBs obtained by segmenting uplink data and UCI, but the invention is not limited thereto. As the method of multiplexing the one or more CBs and UCI, the puncturing processing may be applied, rate matching processing may be applied, or both the puncturing processing and the rate matching processing may be applied. In addition, in the case of applying the rate matching processing, the present invention acquires the frequency diversity effect on the UCI, and has the effect of enabling the quality of the UCI to be improved.

Further, in the above-mentioned Aspects 1 to 3, it is assumed that the UCI is mapped sequentially from a symbol temporally nearer the DMRS within the time unit (e.g., slot) allocated to the PUSCH, but the present invention is not limited thereto. Further, a given offset may be given to a mapping position of the nth UCI.

Furthermore, the order in which UCI is inserted in each CB obtained by segmenting uplink data is not limited particularly. The UCI may be inserted (multiplexed) into each of a plurality of CBs (e.g., 3 CBs #0 to #2) (e.g., CBs #0→#1→#2→#0 . . . ), or may be multiplexed into the next CB after multiplexing into a particular CB (e.g., CBs #0→#0→#0→#1 . . . ).

Still furthermore, frequency first mapping may be applied to each CB obtained by segmenting uplink data (see FIG. 3) and/or time first mapping may be applied thereto (see FIG. 4). Moreover, interleaving processing may be applied to the user terminal, corresponding to a multiplexing position of the UCI.

Further, the above-mentioned Aspects 1 to 3 illustrate 14 symbols and 7 symbols as the time length of the time unit (e.g., slot, mini-slot) to which the PUSCH is allocated, but the time length is not limited thereto. For example, the PUSCH may be allocated to a time unit with the time length of 2 or 3 symbols.

Furthermore, in the above-mentioned Aspects 1 to 3, the radio base station may notify the user terminal of information indicative of at least one parameter used in determining the time position $t_{UCI}$ and frequency position $f_{UCI}$, using higher layer signaling (e.g., at least one of RRC signaling, broadcast information, and system information) and/or physical layer signaling (e.g., downlink control information).

Still furthermore, the "allocation time length ($N_{slot}$) to the PUSCH" described in the above-mentioned Aspects 1 to 3 is not limited to the time unit (e.g., slot or mini-slot) or the number of entire symbols (e.g., 14 symbols in FIGS. 5 to 9) to which the PUSCH is allocated, and may be the number of symbols usable in the PUSCH (e.g., 13 symbols except the DMRS symbol in FIGS. 5 to 9).

(Radio Communication System)

A configuration of a radio communication system according to this Embodiment will be described below. In the radio communication system, the radio communication method according to each of the above-mentioned Aspects is applied. In addition, the radio communication method according to each of the above-mentioned Aspects may be applied alone, or at least two methods may be combined and applied.

Figure 10:
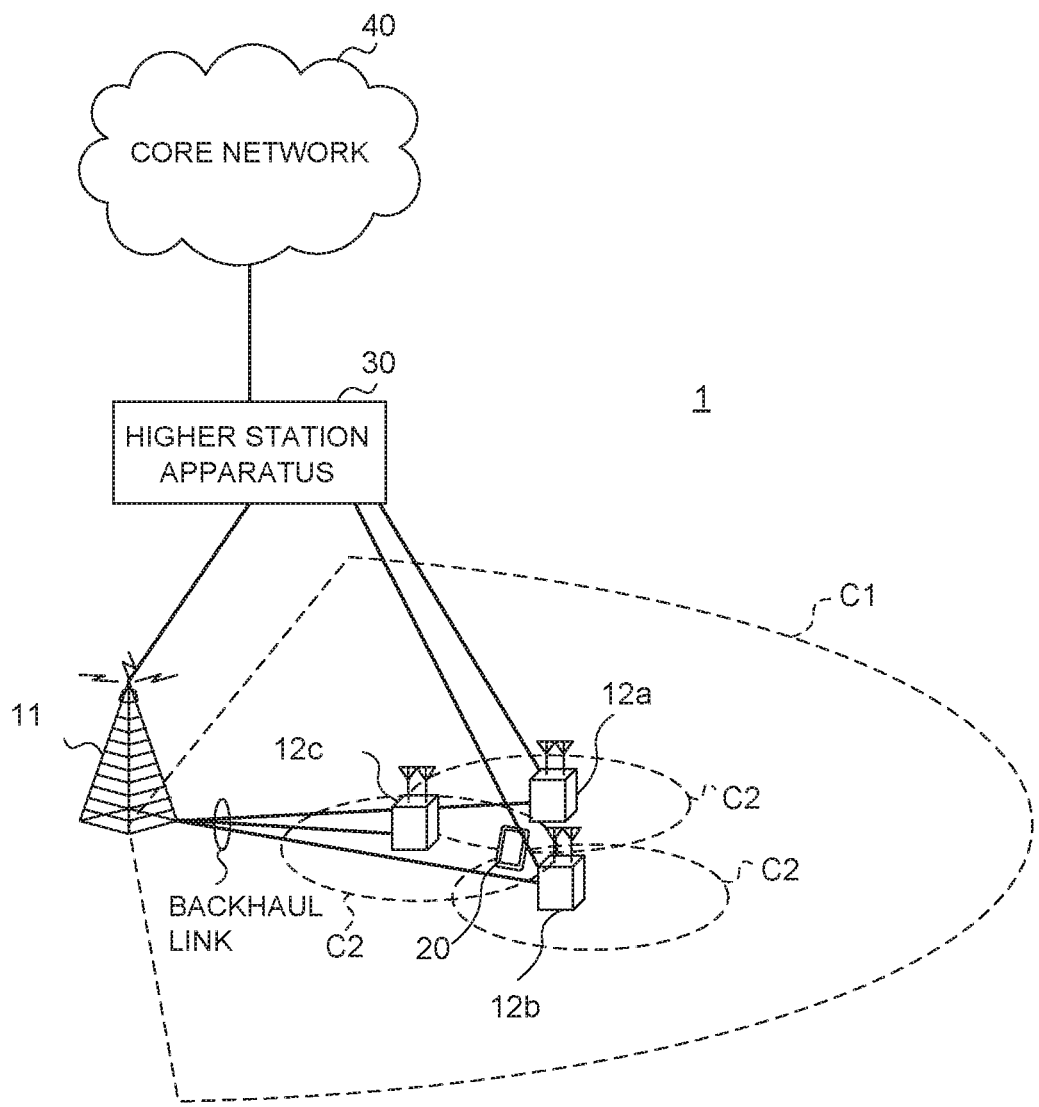
FIG. 10 is a diagram showing one example of a schematic configuration of a radio communication system according to this Embodiment.

FIG. 10 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-Advanced (LTE-A), IMT-Advanced, 4G, 5G, Future Radio Access (FRA), New RAT (NR) and the like.

The radio communication system 1 as shown in FIG. 10 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. It may be configured to apply different numerology between cells. In addition, the numerology refers to as a set of communication parameters characterizing design of signals in some RAT and/or design of RAT.

The user terminal 20 is capable of connecting to both the radio base station 11 and the radio base station 12. The user terminal 20 is assumed to concurrently use the macrocell C1 and small cell C2 using different frequencies, by CA or DC. Further, the user terminal 20 may apply CA or DC using a plurality of cells (CCs) (e.g., 2 or more CCs). Furthermore, the user terminal is capable of using a licensed band CC and an unlicensed band CC as a plurality of CCs.

Moreover, the user terminal 20 is capable of performing communication in each cell, using Time Division Duplex (TDD) or Frequency Division Duplex (FDD). A cell of TDD and a cell of FDD may be called TDD carrier (Frame configuration type 2), FDD carrier (Frame configuration type 1), or the like, respectively.

Further, in each cell (carrier), any one of a subframe (also referred to as TTI, ordinary TTI, long TTI, ordinary subframe, long subframe, slot and the like) having a relatively long time length (e.g., 1 ms) and a subframe (also referred to as short TTI, short subframe, slot and the like) having a relatively short time length may be applied, or both the long subframe and the short subframe may be applied. Further, in each cell, subframes with two or more time lengths may be applied.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30 GHz to 70 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with Common Public Radio Interface (CPRI), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNodeB (eNB), transmission and reception point and the like. Further, the radio base station 12 is a radio base station having local coverage, and may be called a small base station, micro-base station, pico-base station, femto-base station, Home eNodeB (HeNB), Remote Radio Head (RRH), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing Device-to-Device (D2D) communication with another user terminal 20.

In the radio communication system 1, as radio access schemes, Orthogonal Frequency Division Multiple Access (OFDMA) is applicable on downlink (DL), and Single Carrier-Frequency Division Multiple Access (SC-FDMA) is applicable on uplink (UL). OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL. Further, it is possible to apply SC-FDMA to a side link (SL) used in D2D.

As DL channels, in the radio communication system 1 are used a downlink data channel (PDSCH: Physical Downlink Shared Channel, also referred to as DL shared channel, etc.) shared by user terminals 20, broadcast channel (PBCH: Physical Broadcast Channel), L1/L2 control channels and the like. At least one of user data, higher layer control information and System Information Block (SIB) and the like are transmitted on the PDSCH. Further, Master Information Block (MIB) is transmitted on the PBCH.

The L1/L2 control channel includes DL control channels (e.g., Physical Downlink Control Channel (PDCCH) and/or Enhanced Physical Downlink Control channel (EPDCCH)), Physical Control Format Indicator Channel (PCFICH), Physical Hybrid-ARQ Indicator Channel (PHICH) and the like. The downlink control information (DCI) including scheduling information of the PDSCH and PUSCH and the like is transmitted on the PDCCH and/or EPDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit receipt confirmation information (A/N, HARQ-ACK) on the PUSCH, using at least one of the PHICH, PDCCH and EPDCCH.

As UL channels, in the radio communication system 1 are used a UL data channel (PUSCH: Physical Uplink Shared Channel, also referred to as UL shared channel, etc.) shared by user terminals 20, uplink control channel (PUCCH: Physical Uplink Control Channel), random access channel (PRACH: Physical Random Access Channel) and the like. User data and higher layer control information is transmitted on the PUSCH. The uplink control information (UCI) including at least one of receipt confirmation information (A/N, HARQ-ACK) on the PDSCH and channel state information (CSI) is transmitted on the PUSCH or PUCCH. It is possible to transmit a random access preamble to establish connection with the cell on the PRACH.

<Radio Base Station>

Figure 11:
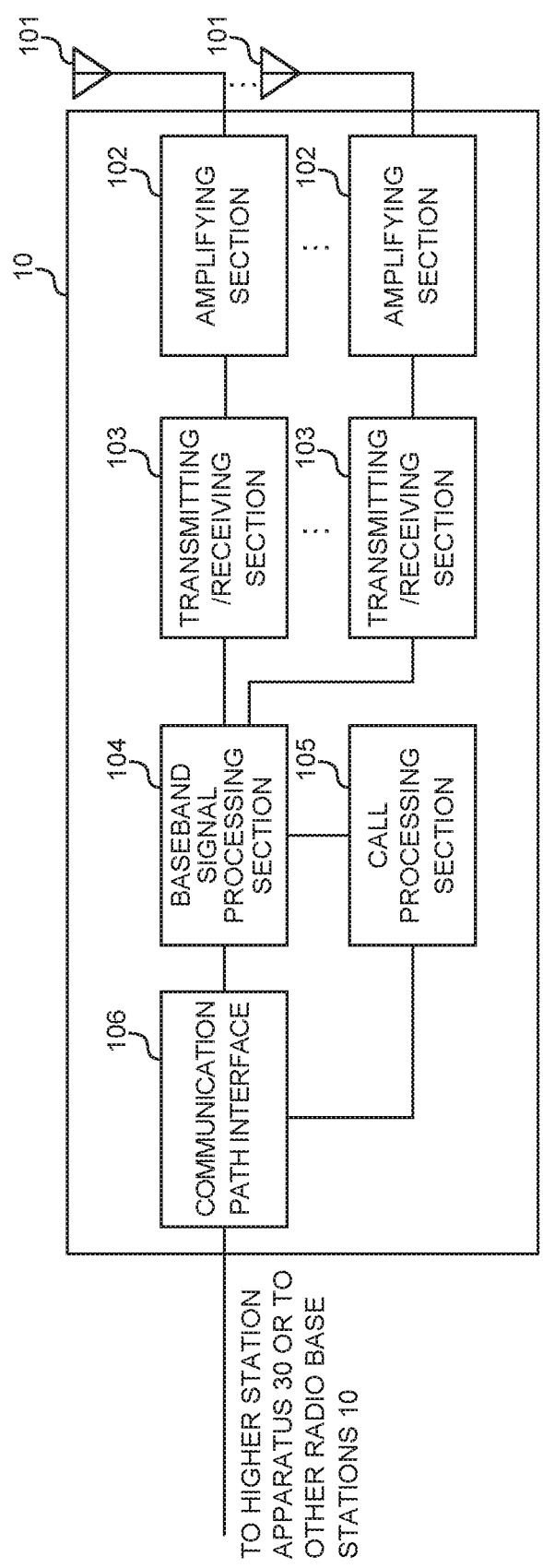
FIG. 11 is a diagram showing one example of an entire configuration of a radio base station according to this Embodiment.

FIG. 11 is a diagram showing one example of an entire configuration of the radio base station according to this Embodiment. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing including at least one of processing of Packet Data Convergence Protocol (PDCP) layer, segmentation and concatenation of the user data, transmission processing of Radio Link Control (RLC) layer such as RLC retransmission control, Medium Access Control (MAC) retransmission control (e.g., processing of Hybrid Automatic Request reQuest (HARQ)), scheduling, transmission format selection, channel coding, rate matching, scrambling, Inverse Fast Fourier Transform (IFFT) processing and precoding processing, and the like to transfer to the transmitting/receiving sections 103. Further, also concerning a downlink control signal, the section 104 performs transmission processing such as channel coding and/or Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101.

The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For uplink data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs at least one of call processing such as configuration and release of a communication channel, state management of the radio base station 10, and management of radio resources.

The communication path interface 106 transmits and receives signals to/from the higher station apparatus 30 via a given interface. Further, the communication path interface 106 may transmit and receive signals (backhaul signaling) to/from another adjacent radio base station 10 via an inter-base station interface (e.g., optical fiber in conformity with Common Public Radio Interface (CPRI), X2 interface).

The transmitting/receiving section 103 receives uplink data (CB) and uplink control information (UCI) multiplexed into the uplink shared channel. The transmitting/receiving section 103 may transmit information on a resource (RE) to undergo puncturing and/or rate matching in each CB. Further, the transmitting/receiving section 103 may transmit information indicative of at least one parameter used in determining the time position $t_{UCI}$ and frequency position $f_{UCI}$ to which the UCI is mapped.

Figure 12:
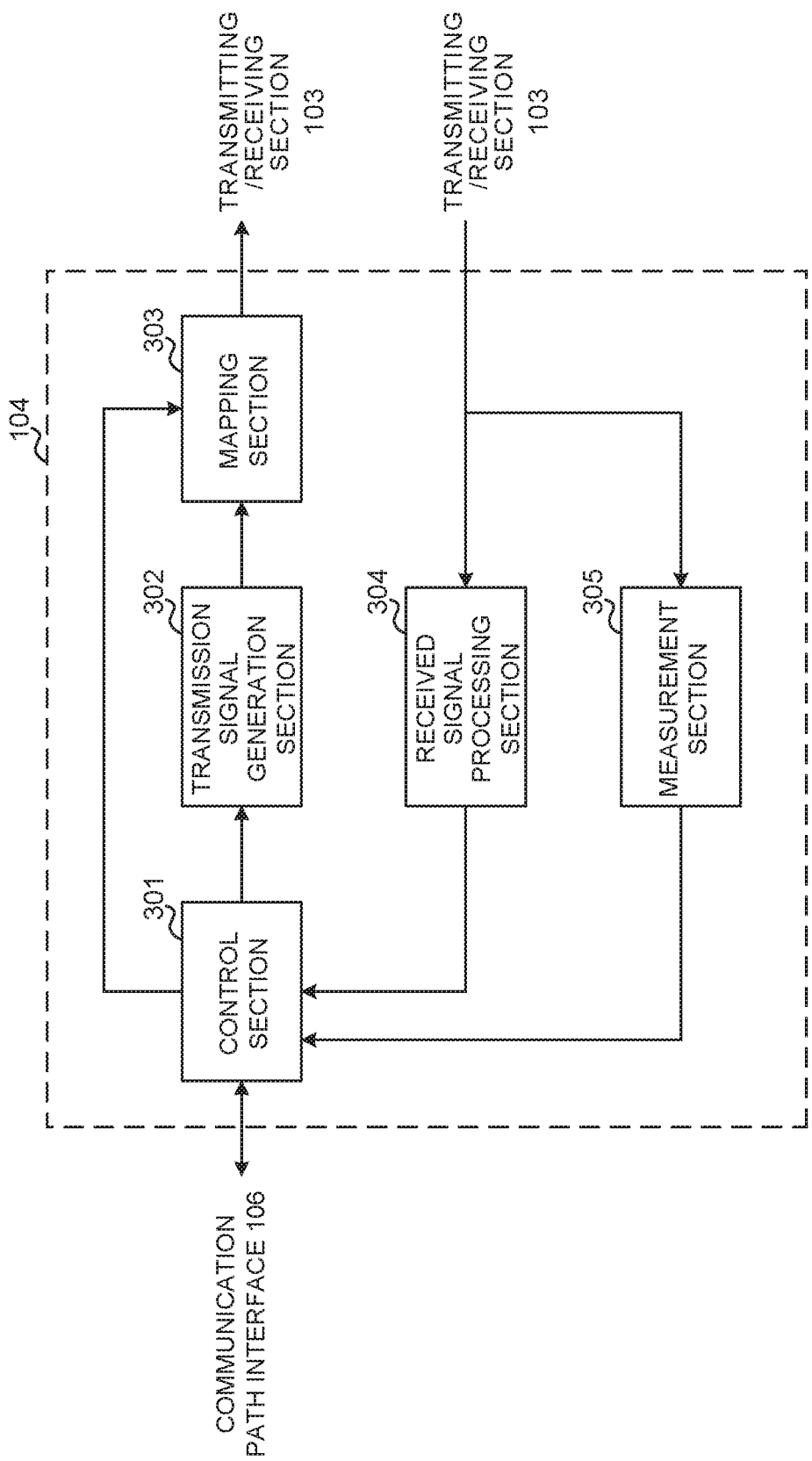
FIG. 12 is a diagram showing one example of a function configuration of the radio base station according to this Embodiment.

FIG. 12 is a diagram showing one example of a function configuration of the radio base station according to this Embodiment. In addition, FIG. 12 mainly illustrates function blocks of a characteristic portion in this Embodiment, and the radio base station 10 is assumed to have other function blocks required for radio communication. As shown in FIG. 12, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls at least one of generation of downlink signals by the transmission signal generating section 302, mapping of downlink signals by the mapping section 303, reception processing (e.g., demodulation, etc.) of uplink signals by the received signal processing section 304, and measurement by the measurement section 305.

Specifically, the control section 301 performs scheduling of the user terminal 20. For example, the control section 301 controls a time unit (e.g., one or more slots) and/or bandwidth (e.g., one or more RBs) to allocate the uplink shared channel. Further, the control section 301 receives the uplink shared channel into which the uplink data and uplink control information is multiplexed.

Moreover, the control section 301 controls demapping of the UCI in a given time interval T and given frequency interval F within the time unit and bandwidth allocated to the uplink shared channel.

Specifically, the control section 301 may control the given time interval T based on a time length of the time unit allocated to the uplink shared channel, and/or may control the given frequency interval F based on the bandwidth allocated to the uplink shared channel (Aspect 1, FIGS. 5 and 6).

Further, based on the time length of the time unit and/or bandwidth allocated to the uplink shared channel, the control section 301 may control the contiguous number ($M_t$ and/or $M_f$) of resource elements to which the UCI is mapped (Aspect 2, FIGS. 7 and 8).

Furthermore, based on the time length of the time unit and/or bandwidth allocated to the uplink shared channel, the control section 301 may control the total number of resource elements to which the UCI is mapped (Aspect 3, FIG. 9).

Still furthermore, in consideration of puncturing and/or rate matching of one or more blocks (CBs) into which the uplink data is segmented with respect to resource elements to which the UCI is mapped, the control section 301 may control reception processing (e.g., demodulation and/or decoding) of the block.

The control section 301 is capable of being comprised of a controller, control circuit or control apparatus explained based on the common recognition in the technical field according to the present invention.

Based on instructions from the control section 301, the transmission signal generating section 302 generates downlink signals (including the downlink data signal, downlink control signal and downlink reference signal) to output to the mapping section 303.

The transmission signal generating section 302 is capable of being a signal generator, signal generating circuit or signal generating apparatus explained based on the common recognition in the technical field according to the present invention.

Based on instructions from the control section 301, the mapping section 303 maps the downlink signal generated in the transmission signal generating section 302 to given radio resources to output to the transmitting/receiving section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding, etc.) on the uplink signal (e.g., including the uplink data signal, uplink control signal and uplink reference signal) transmitted from the user terminal 20. Specifically, the received signal processing section 304 may output the received signal and/or signal subjected to the reception processing to the measurement section 305. Further, based on the uplink control channel configuration indicated from the control section 301, the received signal processing section 304 performs the reception processing of the UCI.

The measurement section 305 performs measurement on the received signal. The measurement section 305 is capable of being comprised of a measurement device, measurement circuit or measurement apparatus explained based on the common recognition in the technical field according to the present invention.

For example, based on received power (e.g., Reference Signal Received Power (RSRP)) and/or received quality (e.g., Reference Signal Received Quality (RSRQ)) of the uplink reference signal, the measurement section 305 may measure the channel quality of UL. The measurement result may be output to the control section 301.

<User Terminal>

Figure 13:
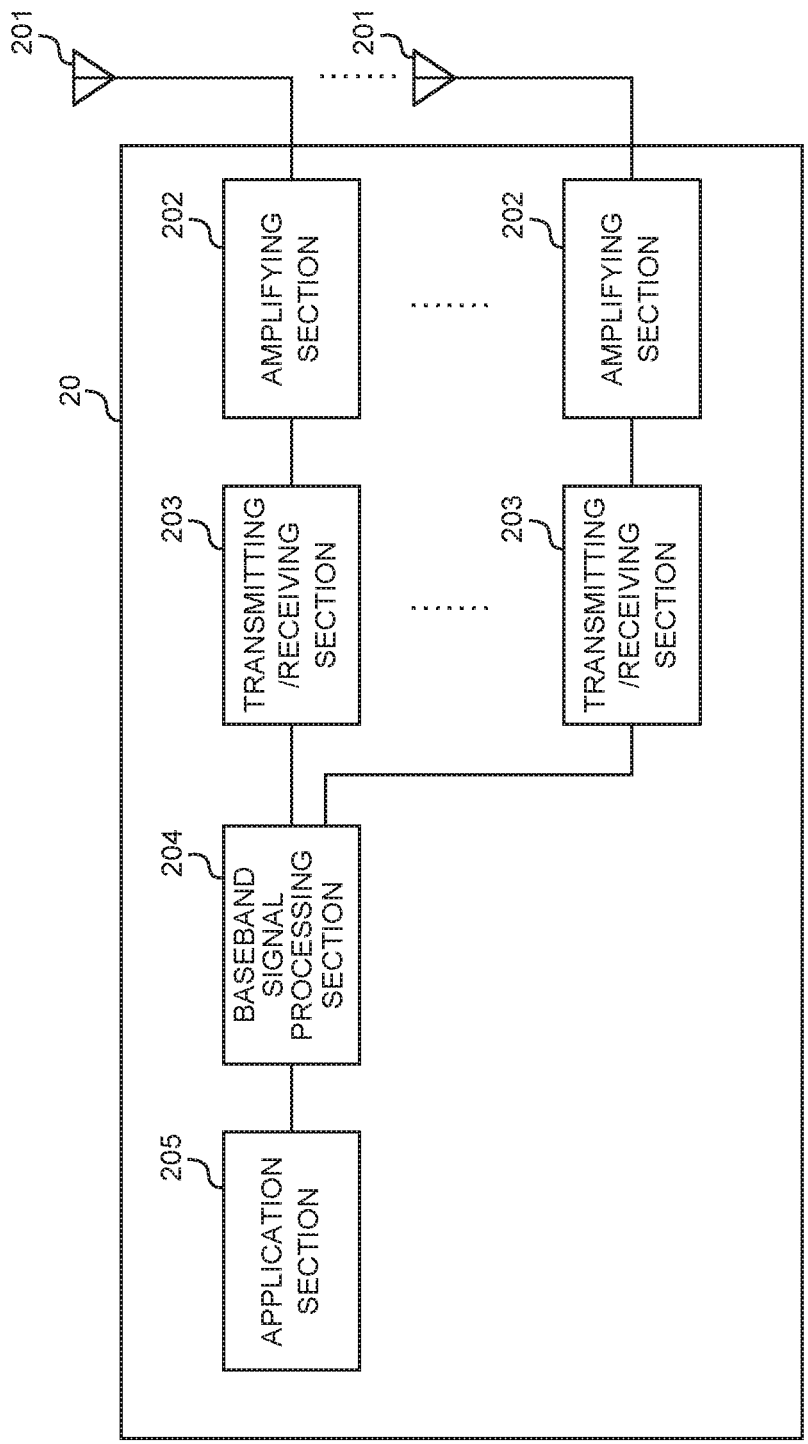
FIG. 13 is a diagram showing one example of an entire configuration of a user terminal according to this Embodiment.

FIG. 13 is a diagram showing one example of an entire configuration of the user terminal according to this Embodiment. The user terminal 20 is provided with a plurality of transmitting/receiving antennas 201 for MIMO transmission, amplifying sections 202, transmitting/receiving sections 203, baseband signal processing section 204, and application section 205.

Radio-frequency signals received in a plurality of transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204.

The baseband signal processing section 204 performs at least one of FFT processing, error correcting decoding, reception processing of retransmission control and the like on the input baseband signal. Downlink data is transferred to the application section 205. The application section 205 performs processing concerning layers higher than the physical layer and MAC layer, and the like.

On the other hand, for uplink data, the data is input to the baseband signal processing section 204 from the application section 205. The baseband signal processing section 204 performs, on the data, at least one of retransmission control processing (e.g., processing of HARQ), channel coding, rate matching, puncturing, Discrete Fourier Transform (DFT) processing, IFFT processing and the like to transfer to each of the transmitting/receiving sections 203. Also on the UCI (e.g., at least one of A/N of the downlink signal, channel state information (CSI) and scheduling request (SR) and the like), the section 204 performs at least one of channel coding, rete matching, puncturing, DFT processing, IFFT processing and the like to transfer to each of the transmitting/receiving sections 203.

Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

The transmitting/receiving section 203 transmits one or more blocks (CBs) into which the uplink data is segmented and the uplink control information (UCI), using the uplink shared channel. The transmitting/receiving section 203 may receive the information on the resource (RE) to undergo puncturing and/or rate matching in each CB. Further, the transmitting/receiving section 203 may receive the information indicative of at least one parameter used in determining the time position $t_{UCI}$ and frequency position $f_{UCI}$ to which the UCI is mapped.

The transmitting/receiving section 203 is capable of being a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

Figure 14:
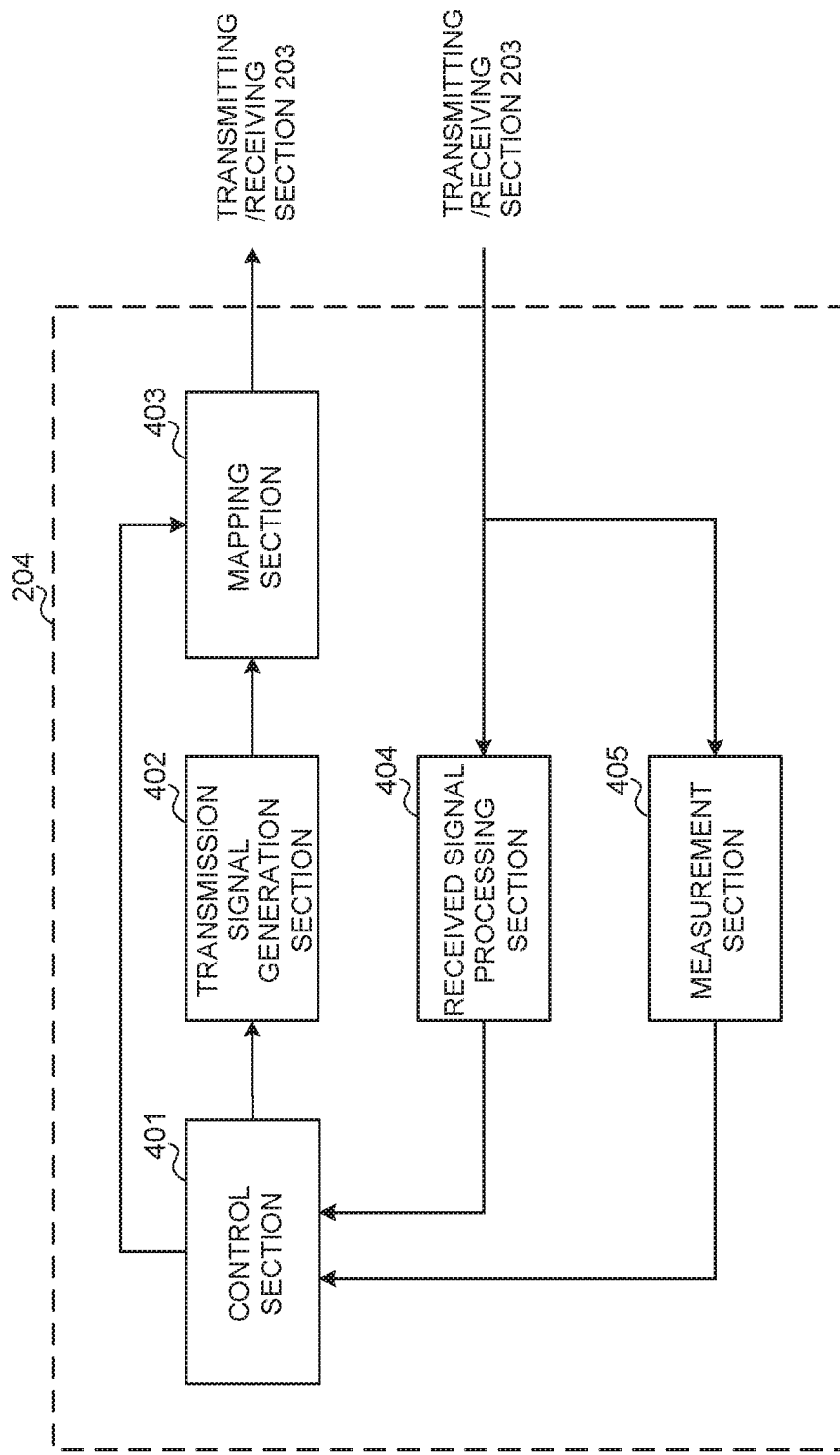
FIG. 14 is a diagram showing one example of a function configuration of the user terminal according to this Embodiment.

FIG. 14 is a diagram showing one example of a function configuration of the user terminal according to this Embodiment. In addition, FIG. 14 mainly illustrates function blocks of a characteristic portion in this Embodiment, and the user terminal 20 is assumed to have other function blocks required for radio communication. As shown in FIG. 14, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls at least one of generation of uplink signals by the transmission signal generating section 402, mapping of uplink signals by the mapping section 403, reception processing of downlink signals by the received signal processing section 404, and measurement by the measurement section 405.

Further, the control section 401 controls transmission of the uplink data (e.g., CB) and uplink control information (UCI) using the uplink shared channel (PUSCH).

Furthermore, the control section 401 controls mapping of the UCI in the given time interval T and given frequency interval F within the time unit and bandwidth allocated to the uplink shared channel.

Specifically, the control section 401 may control the given time interval T based on a time length of the time unit allocated to the uplink shared channel, and/or may control the given frequency interval F based on the bandwidth allocated to the uplink shared channel (Aspect 1, FIGS. 5 and 6).

Further, based on the time length of the time unit and/or bandwidth allocated to the uplink shared channel, the control section 401 may control the contiguous number ($M_t$ and/or $M_f$) of resource elements to which the UCI is mapped (Aspect 2, FIGS. 7 and 8).

Furthermore, based on the time length of the time unit and/or bandwidth allocated to the uplink shared channel, the control section 401 may control the total number of resource elements to which the UCI is mapped (Aspect 3, FIG. 9).

Still furthermore, the control section 401 may control puncturing and/or rate matching of one or more blocks (CBs) into which the uplink data is segmented with respect to resource elements to which the UCI is mapped.

The control section 401 is capable of being comprised of a controller, control circuit or control apparatus explained based on the common recognition in the technical field according to the present invention.

Based on instructions from the control section 401, the transmission signal generating section 402 generates (e.g., performs coding, rate matching, puncturing, modulation, etc. on) uplink signals (including the uplink data signal, uplink control signal, uplink reference signal and UCI) to output to the mapping section 403. The transmission signal generating section 402 is capable of being a signal generator, signal generating circuit or signal generating apparatus explained based on the common recognition in the technical field according to the present invention.

Based on instructions from the control section 401, the mapping section 403 maps the uplink signal (uplink data, uplink control information and the like) generated in the transmission signal generating section 402 to radio resources to output to the transmitting/receiving section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding, etc.) on the downlink signal (downlink data signal, scheduling information, downlink control signal, downlink reference signal). The received signal processing section 404 outputs the information received from the radio base station 10 to the control section 401. For example, the received signal processing section 404 outputs, to the control section 401, the broadcast information, system information, higher layer control information by higher layer signaling such as RRC signaling, physical layer control information (L1/L2 control information), and the like.

The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

Based on a reference signal (e.g., CSI-RS) from the radio base station 10, the measurement section 405 measures a channel state, and outputs the measurement result to the control section 401. In addition, measurement of the channel state may be performed for each CC.

The measurement section 405 is capable of being comprised of a signal processing device, signal processing circuit or signal processing apparatus and a measurement device, measurement circuit or measurement apparatus explained based on the common recognition in the technical field according to the present invention.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 15:
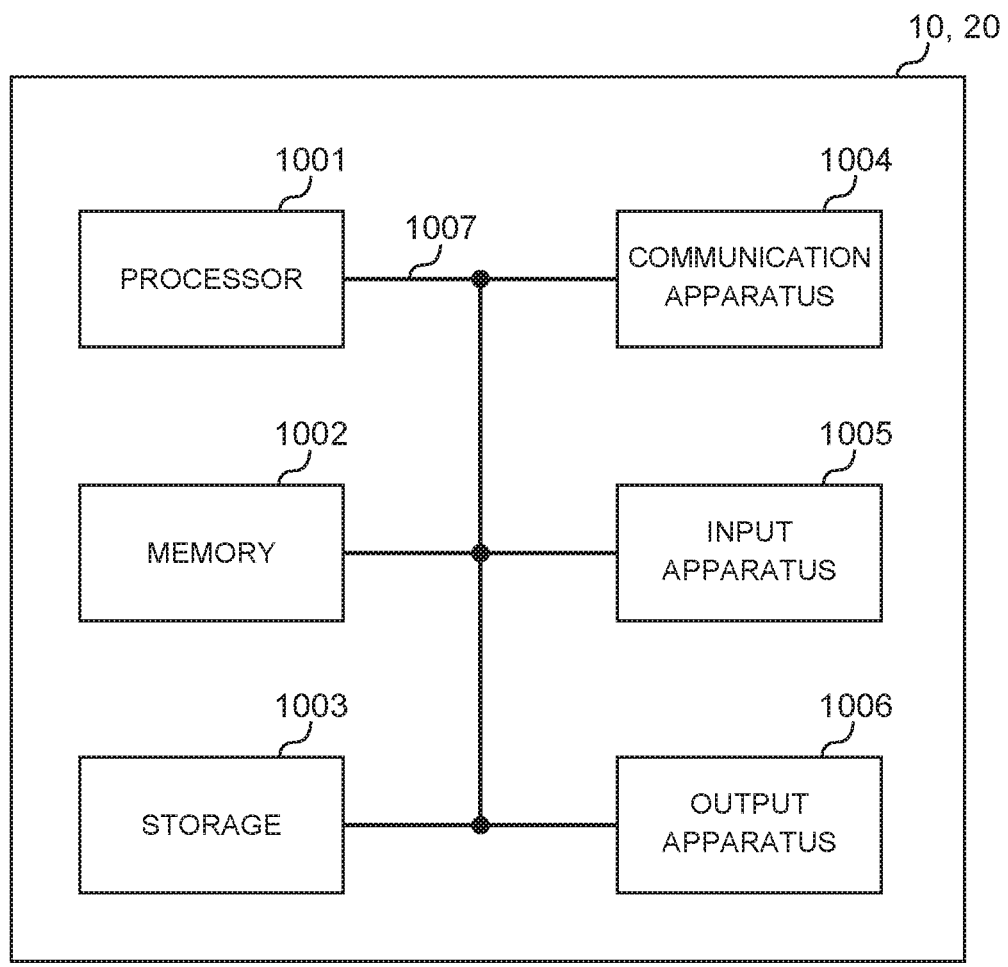
FIG. 15 is a diagram showing one example of hardware configurations of the radio base station and user terminal according to this Embodiment.

For example, each of the radio base station, user terminal and the like in this Embodiment may function as a computer that performs the processing of the radio communication method of the present invention. FIG. 15 is a diagram showing one example of a hardware configuration of each of the radio base station and user terminal according to this Embodiment. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that given software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM), Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to this Embodiment.

The storage 1003 is a computer-readable storage medium, and for example, may be comprised of at least one of a flexible disk, Floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the radio base station 10 and user terminal 20 may be configured by including hardware such as a microprocessor, Digital Signal Processor (DSP), Application Specific Integrated Circuit (ASIC), Programmable Logic Device (PLD), and Field Programmable Gate Array (FPGA), or a part or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as Reference Signal (RS), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (Orthogonal Frequency Division Multiplexing (OFDM) symbols, Single Carrier Frequency Division Multiple Access (SC-FDMA) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a given value, or may be expressed using another corresponding information. For example, the radio resource may be indicated by a given index.

The names used in the parameter and the like in the present Description are not restrictive names in any respects. For example, it is possible to identify various channels (Physical Uplink Control Channel (PUCCH), Physical Downlink Control Channel (PDCCH) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed using another method. For example, notification of the information may be performed using physical layer signaling (e.g., Downlink Control Information (DCI), Uplink Control Information (UCI)), higher layer signaling (e.g., Radio Resource Control (RRC) signaling, broadcast information (Master Information Block (MIB), System Information Block (SIB) and the like), Medium Access Control (MAC) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of given information (e.g., notification of "being X") is not limited to explicit notification, and may be performed implicitly (e.g., notification of the given information is not performed, or by notification of different information).

The decision may be made with a value ("0" or "1") expressed by 1 bit, may be made with a Boolean value represented by true or false, or may be made by comparison with a numerical value (e.g., comparison with a given value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, femto-cell, small cell and the like.

The base station is capable of accommodating one or a plurality of (e.g., three) cells (also called the sector). When the base station accommodates a plurality of cells, the entire coverage area of the base station is capable of being segmented into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), Radio Access Technology (New-RAT), New Radio (NR), New radio access (NX), Future generation radio access (FX), GSM (Registered Trademark) (Global System for Mobile communications), CDMA 2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the terms of "A and B are different" may mean that "A and B are different from each other". The terms of "separate", "coupled" and the like may be similarly interpreted.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The invention claimed is:

1. A terminal comprising:
    a transmitter that transmits uplink data and uplink control information using an uplink shared channel; and
    a processor that determines, based on a bandwidth allocated to the uplink shared channel, one or more resource elements,
    wherein the one or more resource elements have a time interval and a frequency interval and are used for mapping the uplink control information,
    wherein the processor further maps the uplink control information, in the time interval and in the frequency interval, to the one or more resource elements,
    wherein the processor determines, based on the bandwidth allocated to the uplink shared channel, the one or more resource elements to which the uplink control information is mapped in the time interval and the frequency interval, and
    wherein the processor determines the frequency interval based on a number of bits available for transmission of the uplink control information in a symbol.

2. The terminal according to claim 1, wherein the processor maps the uplink data to at least one resource element other than the one or more resource elements that are used for mapping the uplink control information.

3. The terminal according to claim 1, wherein, regardless of a multiplexing position of the uplink control information, the processor overwrites the uplink data, which is mapped to at least one resource element, with the uplink control information.

4. The terminal according to claim 1, wherein the uplink control information comprises at least one of a delivery acknowledgement information for a downlink shared channel and a channel state information.

5. The terminal according to claim 2, wherein the uplink control information comprises at least one of a delivery acknowledgement information for a downlink shared channel and a channel state information.

6. The terminal according to claim 3, wherein the uplink control information comprises at least one of a delivery acknowledgement information for a downlink shared channel and a channel state information.

7. A radio communication method for a terminal, comprising:
    transmitting uplink data and uplink control information using an uplink shared channel; and
    determining, based on a bandwidth allocated to the uplink shared channel, one or more resource elements,
    wherein the one or more resource elements have a time interval and a frequency interval and are used for mapping the uplink control information;
    mapping the uplink control information, in the time interval and in the frequency interval, to the one or more resource elements;
    determining, based on the bandwidth allocated to the uplink shared channel, the one or more resource elements to which the uplink control information is mapped in the time interval and the frequency interval; and
    determining the frequency interval based on a number of bits available for transmission of the uplink control information in a symbol.

8. A base station comprising:
a receiver that receives uplink data and uplink control information on uplink shared channel; and
a processor that determines, based on a bandwidth allocated to the uplink shared channel, one or more resource elements to which the uplink control information is mapped,
wherein the one or more resource elements have a time interval and a frequency interval,
wherein the uplink control information is mapped, in the time interval and in the frequency interval, to the one or more resource elements,
wherein the processor determines, based on the bandwidth allocated to the uplink shared channel, the one or more resource elements to which the uplink control information is mapped in the time interval and the frequency interval, and
wherein the processor determines the frequency interval based on a number of bits available for transmission of the uplink control information in a symbol.

9. A system comprising a terminal and a base station, wherein:
the terminal comprises:
a transmitter that transmits uplink data and uplink control information using an uplink shared channel; and
a processor that determines, based on a bandwidth allocated to the uplink shared channel, one or more resource elements,
wherein the one or more resource elements have a time interval and a frequency interval and are used for mapping the uplink control information,
wherein the processor further maps the uplink control information, in the time interval and in the frequency interval, to the one or more resource elements,
wherein the processor determines, based on the bandwidth allocated to the uplink shared channel, the one or more resource elements to which the uplink control information is mapped in the time interval and the frequency interval, and
wherein the processor determines the frequency interval based on a number of bits available for transmission of the uplink control information in a symbol; and
the base station comprises:
a receiver that receives the uplink data and the uplink control information on the uplink shared channel.

\* \* \* \* \*